US011317396B2

(12) United States Patent
Khoshnevisan et al.

(10) Patent No.: US 11,317,396 B2
(45) Date of Patent: Apr. 26, 2022

(54) PDSCH/PUSCH REPETITION ENHANCEMENTS FOR URLLC

(71) Applicant: QUALCOMM Incorporated, San Diego, CA (US)

(72) Inventors: Mostafa Khoshnevisan, San Diego, CA (US); Xiaoxia Zhang, San Diego, CA (US); Sungwoo Park, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 16/872,820

(22) Filed: May 12, 2020

(65) Prior Publication Data

US 2020/0367208 A1 Nov. 19, 2020

Related U.S. Application Data

(60) Provisional application No. 62/847,806, filed on May 14, 2019.

(51) Int. Cl.
*H04W 72/04* (2009.01)
*H04L 5/00* (2006.01)

(52) U.S. Cl.
CPC ......... *H04W 72/042* (2013.01); *H04L 5/0048* (2013.01)

(58) Field of Classification Search
CPC .............................. H04W 72/042; H04L 5/0048
See application file for complete search history.

(56) References Cited

PUBLICATIONS

CAICT: "PUSCH Enhancements for URLLC", 3GPP Draft; R1-1907204, 3rd Generation Partnership Project (3GPP), Mobile Competence Centre; 650, Route Des Lucioles; F-06921 Sophia-Antipolis Cedex; France, vol. RAN WG1, No. Reno, USA; May 13, 2019-May 17, 2019, May 13, 2019 (May 13, 2019), 7 Pages, XP051728647, Retrieved from the Internet: URL: http://www.3gpp.org/ftp/Meetings%5F3GPP%5FSYNC/RAN1/Docs/R1%2D1907204%2Ezip [retrieved on May 13, 2019], paragraph [02 .1]-paragraph [02. 2].

(Continued)

*Primary Examiner* — Ronald B Abelson
(74) *Attorney, Agent, or Firm* — Qualcomm /Norton Rose Fulbright US LLP

(57) ABSTRACT

PDSCH and PUSCH repetition enhancements are disclosed. A UE may determine configuration data (e.g., transmission parameters, and/or RV data) for PDSCH/PUSCH repetitions which are split across a slot transition within a slot or across a slot boundary based on a quantity of nominal repetitions indicated by a downlink control message (e.g., a downlink control information signal). A quantity of actual repetitions (e.g., splitting of one or more nominal repetitions) may be identified based on the quantity of nominal repetitions and slot configuration parameters. In some aspects, a UE determines a sequence of configuration data for nominal repetitions and generates a second sequence of configuration data for actual repetitions based on the sequence. In other aspects, a UE determines a single sequence of configuration data for actual repetitions based on the quantity of actual repetitions determined from the quantity of nominal repetitions indicated by the downlink control message.

30 Claims, 14 Drawing Sheets

(56) References Cited

PUBLICATIONS

International Search Report and Written Opinion—PCT/US2020/032708—ISA/EPO—dated Sep. 29, 2020.
NTT DOCOMO., et al., "Enhancements on Multi-TRP/Panel Transmission", 3GPP Draft; R1-1906224, 3rd Generation Partnership Project (3GPP), Mobile Competence Centre ; 650, Route Des Lucioles; F-06921 Sophia-Antipolis Cedex; France, vol. RAN WG1, No. Reno, USA; May 13, 2019-May 17, 2019 May 13, 2019, (May 13, 2019), EFS, XP051727678, Retrieved from the Internet: URL: http://www.3gpp.org/ftp/Meetings%5F3GPP%5FSYNC/RAN1/Docs/R1%2D1906224%2Ezip [retrieved on May 13, 2019], p. 19, Paragraph 3.1.1-p. 21, Paragraph 3 .1. 2.

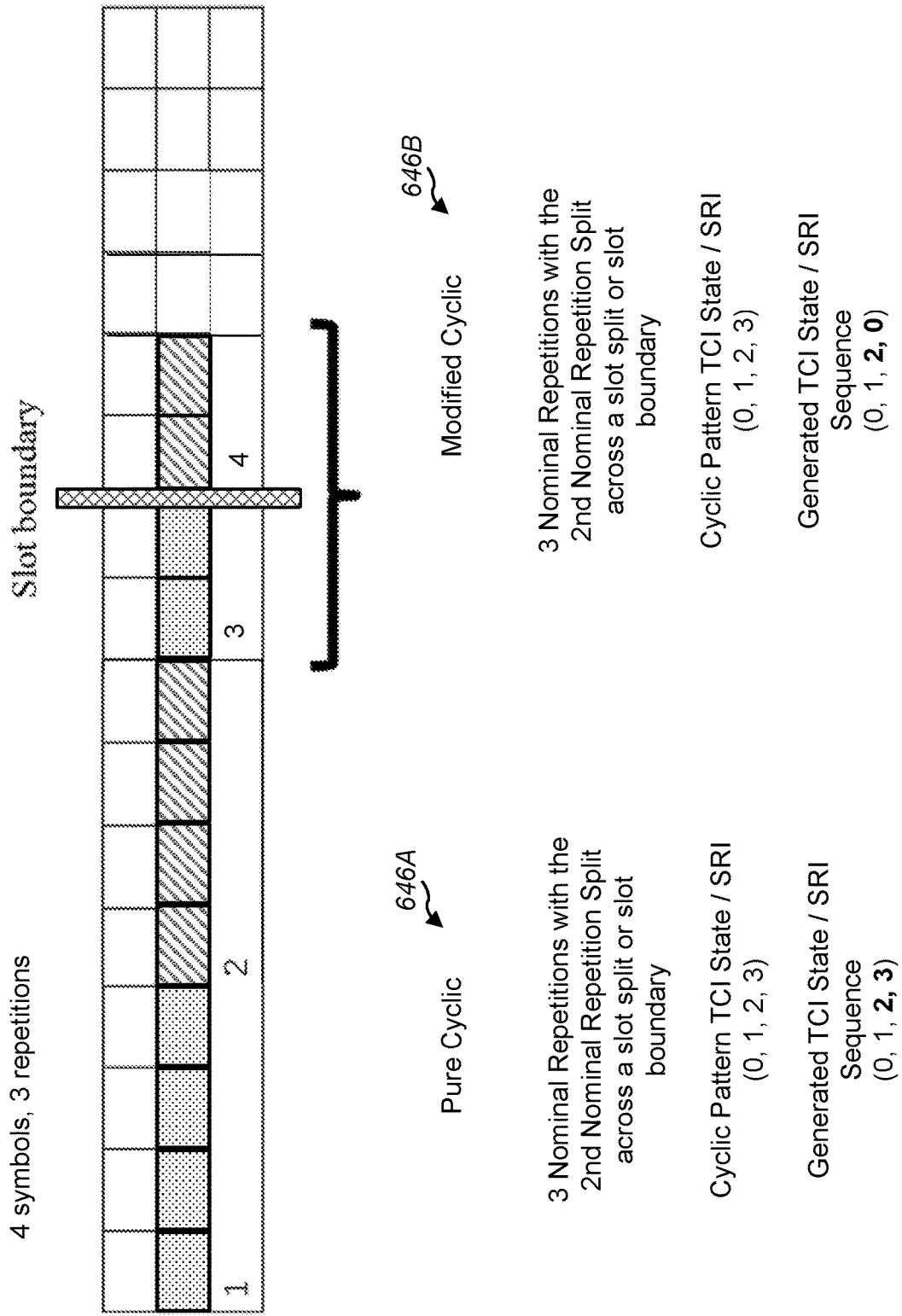

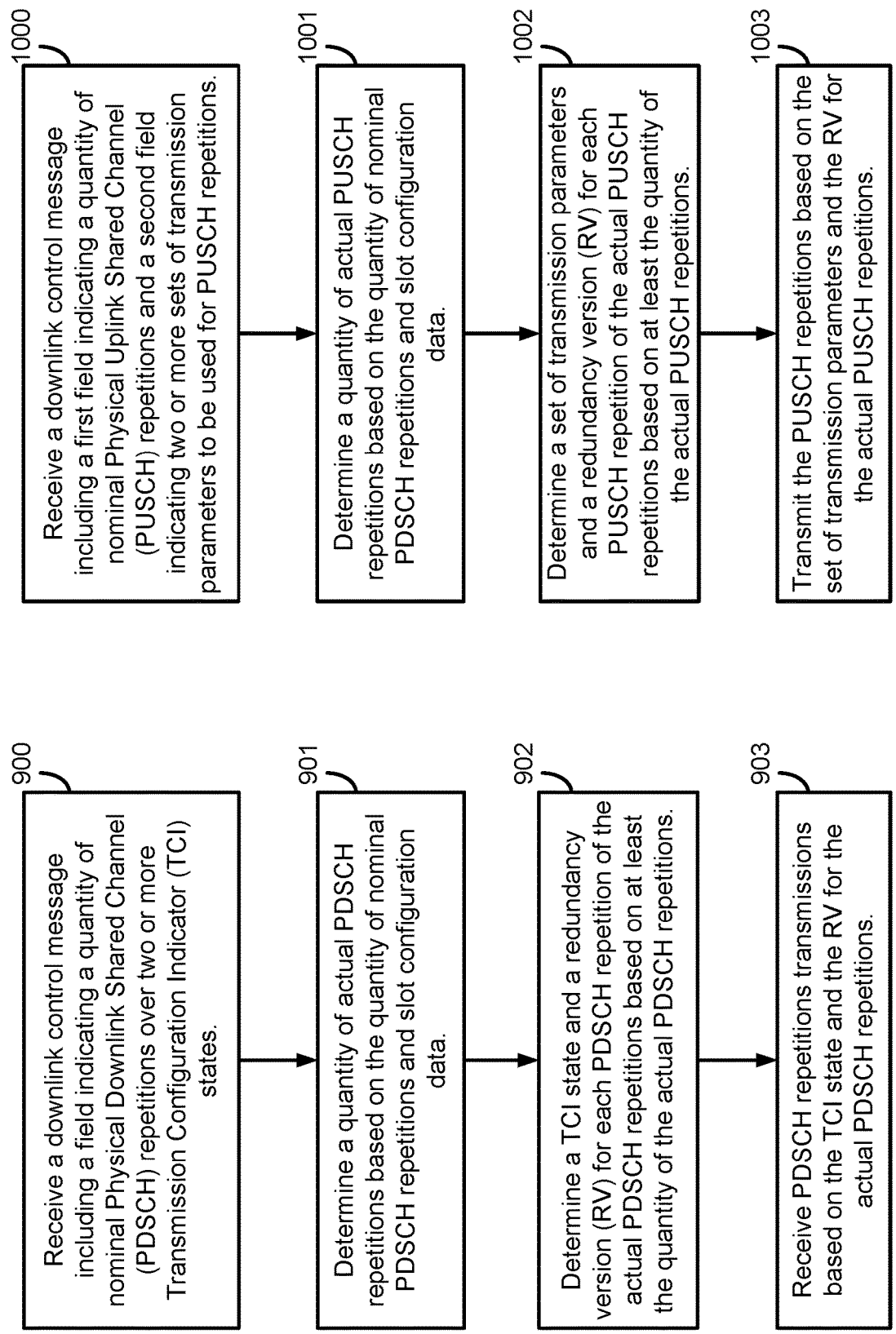

PDSCH/PUSCH REPETITION ENHANCEMENTS FOR URLLC

CROSS-REFERENCE TO RELATED APPLICATIONS

This application claims the benefit of U.S. Provisional Patent Application No. 62/847,806, entitled, "PDSCH/PUSCH REPETITION ENHANCEMENTS FOR URLLC," filed on May 14, 2019, which is expressly incorporated by reference herein in its entirety.

BACKGROUND

Field

Aspects of the present disclosure relate generally to wireless communication systems, and more particularly, by way of example but not limitation, to enhancements for repetitions of PDSCH and PUSCH in URLLC.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

The described techniques relate to improved methods, systems, devices, and apparatuses that support PDSCH/PUSCH repetition enhancements. The PDSCH/PUSCH repetition enhancements enable a devices of a network to employ PDSCH/PUSCH repetitions that are split within a slot, such as due to symbol transition, or that are split across two slots due to a slot boundary. Indicated PDSCH/PUSCH repetitions (e.g., indicated by a transmitting device, such as a base station) are generally referred to as nominal repetitions, and nominal PDSCH/PUSCH repetitions that are split due to transitions or boundaries are generally referred to as actual repetitions. Generally, the described techniques provide for indicating a signaling information for nominal PDSCH/PUSCH repetitions and determining signaling information for actual PDSCH/PUSCH repetitions. Such techniques may include converting the signaling information for nominal PDSCH/PUSCH repetitions into signaling information for actual PDSCH/PUSCH repetitions or generating signaling information for actual PDSCH/PUSCH repetitions based on the received signaling information.

The PDSCH/PUSCH repetition enhancements may enable operation in a multi-TRP scheme (e.g., a spatial division multiplexing (SDM) scheme, a frequency division multiplexing (FDM) scheme, a time division multiplexing (TDM) scheme, etc.) and/or enable operation in ultra-reliable low latency communication modes (URLLC), such as enhanced URLLC (eURLLC). One exemplary operation which is enabled by the described methods, devices, and systems includes supporting (e.g., signaling) of one or more actual PDSCH/PUSCH repetitions in one slot or supporting (e.g., signaling) two or more actual repetitions across a slot boundary in consecutive slots by one Uplink grant for dynamic PDSCH/PUSCH and one configured grant configuration for configured grant PDSCH/PUSCH.

In one aspect of the disclosure, a method of wireless communication includes receiving, by a user equipment (UE), a downlink control information (DCI) including a field indicating a quantity of nominal Physical Downlink Shared Channel (PDSCH) repetitions over two or more Transmission Configuration Indicator (TCI) states, determining, by the UE, a quantity of actual PDSCH repetitions based on the quantity of nominal PDSCH repetitions and slot configuration data, determining, by the UE, a TCI state and a redundancy version (RV) for each PDSCH repetition of the actual PDSCH repetitions based on at least the quantity of the actual PDSCH repetitions, and receiving, by the UE, PDSCH repetitions transmissions based on the TCI state and the RV for the actual PDSCH repetitions.

In an additional aspect of the disclosure, an apparatus configured for wireless communication includes means for receiving a downlink control information (DCI) including a field indicating a quantity of nominal Physical Downlink Shared Channel (PDSCH) repetitions over two or more Transmission Configuration Indicator (TCI) states, means for determining a quantity of actual PDSCH repetitions based on the quantity of nominal PDSCH repetitions and slot configuration data, means for determining a TCI state and a redundancy version (RV) for each PDSCH repetition of the actual PDSCH repetitions based on at least the quantity of the actual PDSCH repetitions, and means for receiving PDSCH repetitions transmissions based on the TCI state and the RV for the actual PDSCH repetitions.

In an additional aspect of the disclosure, a non-transitory computer-readable medium having program code recorded thereon. The program code further includes code to receive, by a user equipment (UE), a downlink control information (DCI) including a field indicating a quantity of nominal Physical Downlink Shared Channel (PDSCH) repetitions over two or more Transmission Configuration Indicator (TCI) states, determine, by the UE, a quantity of actual PDSCH repetitions based on the quantity of nominal PDSCH repetitions and slot configuration data, determine, by the UE, a TCI state and a redundancy version (RV) for each PDSCH repetition of the actual PDSCH repetitions based on at least the quantity of the actual PDSCH repetitions, and receive, by the UE, PDSCH repetitions transmissions based on the TCI state and the RV for the actual PDSCH repetitions.

In an additional aspect of the disclosure, an apparatus configured for wireless communication is disclosed. The apparatus includes at least one processor, and a memory coupled to the processor. The processor is configured to receive, by a user equipment (UE), a downlink control information (DCI) including a field indicating a quantity of nominal Physical Downlink Shared Channel (PDSCH) repetitions over two or more Transmission Configuration Indicator (TCI) states, determine, by the UE, a quantity of actual PDSCH repetitions based on the quantity of nominal PDSCH repetitions and slot configuration data, determine, by the UE, a TCI state and a redundancy version (RV) for each PDSCH repetition of the actual PDSCH repetitions based on at least the quantity of the actual PDSCH repetitions, and receive, by the UE, PDSCH repetitions transmissions based on the TCI state and the RV for the actual PDSCH repetitions.

In another aspect of the disclosure, a method of wireless communication includes receiving, by a user equipment (UE), a downlink control message including a first field indicating an amount of nominal Physical Uplink Shared Channel (PUSCH) repetitions and a second field indicating two or more sets of transmission parameters to be used for transmission of PUSCH repetitions, determining, by the UE, a quantity of actual PUSCH repetitions based on the quantity of nominal PUSCH repetitions and slot configuration data, determining, by the UE, a set of transmission parameters and a redundancy version (RV) for each PUSCH repetition of the actual PUSCH repetitions based on at least the quantity of the actual PUSCH repetitions, and transmitting, by the UE, the PUSCH repetitions transmissions based on the set of transmission parameters and the RV for the actual PUSCH repetitions.

In an additional aspect of the disclosure, an apparatus configured for wireless communication includes means for receiving, by a user equipment (UE), a downlink control message including a first field indicating a quantity of nominal Physical Uplink Shared Channel (PUSCH) repetitions and a second field indicating two or more sets of transmission parameters to be used for transmission of PUSCH repetitions, by the UE, a quantity of actual PUSCH repetitions based on the quantity of nominal PUSCH repetitions and slot configuration data, means for determining, by the UE, a set of transmission parameters and a redundancy version (RV) for each PUSCH repetition of the actual PUSCH repetitions based on at least the quantity of the actual PUSCH repetitions, and means for transmitting, by the UE, the PUSCH repetitions transmissions based on the set of transmission parameters and the RV for the actual PUSCH repetitions.

In an additional aspect of the disclosure, a non-transitory computer-readable medium having program code recorded thereon. The program code further includes code to receive, by a user equipment (UE), a downlink control message including a first field indicating a quantity of nominal Physical Uplink Shared Channel (PUSCH) repetitions and a second field indicating two or more sets of transmission parameters to be used for transmission of PUSCH repetitions, program code executable by a computer for causing the computer to determine, by the UE, a quantity of actual PUSCH repetitions based on the quantity of nominal PUSCH repetitions and slot configuration data, program code executable by a computer for causing the computer to determine, by the UE, a set of transmission parameters and a redundancy version (RV) for each PUSCH repetition of the actual PUSCH repetitions based on at least the quantity of the actual PUSCH repetitions, and program code executable by a computer for causing the computer to transmit, by the UE, the PUSCH repetitions transmissions based on the set of transmission parameters and the RV for the actual PUSCH repetitions.

In an additional aspect of the disclosure, an apparatus configured for wireless communication is disclosed. The apparatus includes at least one processor, and a memory coupled to the processor. The processor is configured to receive, by a user equipment (UE), a downlink control message including a first field indicating a quantity of nominal Physical Uplink Shared Channel (PUSCH) repetitions and a second field indicating two or more sets of transmission parameters to be used for transmission of PUSCH repetitions, by the UE, a quantity of actual PUSCH repetitions based on the quantity of nominal PUSCH repetitions and slot configuration data, to determine, by the UE, a set of transmission parameters and a redundancy version (RV) for each PUSCH repetition of the actual PUSCH repetitions based on at least the quantity of the actual PUSCH repetitions, and to transmit, by the UE, the PUSCH repetitions transmissions based on the set of transmission parameters and the RV for the actual PUSCH repetitions.

In another aspect of the disclosure, a method of wireless communication includes receiving, by a user equipment (UE), a downlink control message including a field indicating a quantity of nominal Physical Uplink Shared Channel (PUSCH) repetitions over two or more Sounding Reference Signal (SRS) Resource Indicators (SRIs), determining, by the UE, a quantity of actual PUSCH repetitions based on the quantity of nominal PUSCH repetitions and slot configuration data, determining, by the UE, a SRI and a redundancy version (RV) for each PUSCH repetition of the actual PUSCH repetitions based on at least the quantity of the actual PUSCH repetitions, and transmitting, by the UE, PUSCH repetitions transmissions based on the SRI and the RV for the actual PUSCH repetitions.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 6A-6D are each block diagram illustrating an example repetition slot format.

FIG. 9 is a block diagram illustrating example blocks executed by a UE configured according to an aspect of the present disclosure.

FIG. 10 is a block diagram illustrating example blocks executed by a UE configured according to an aspect of the present disclosure.

DETAILED DESCRIPTION

Figure 1:
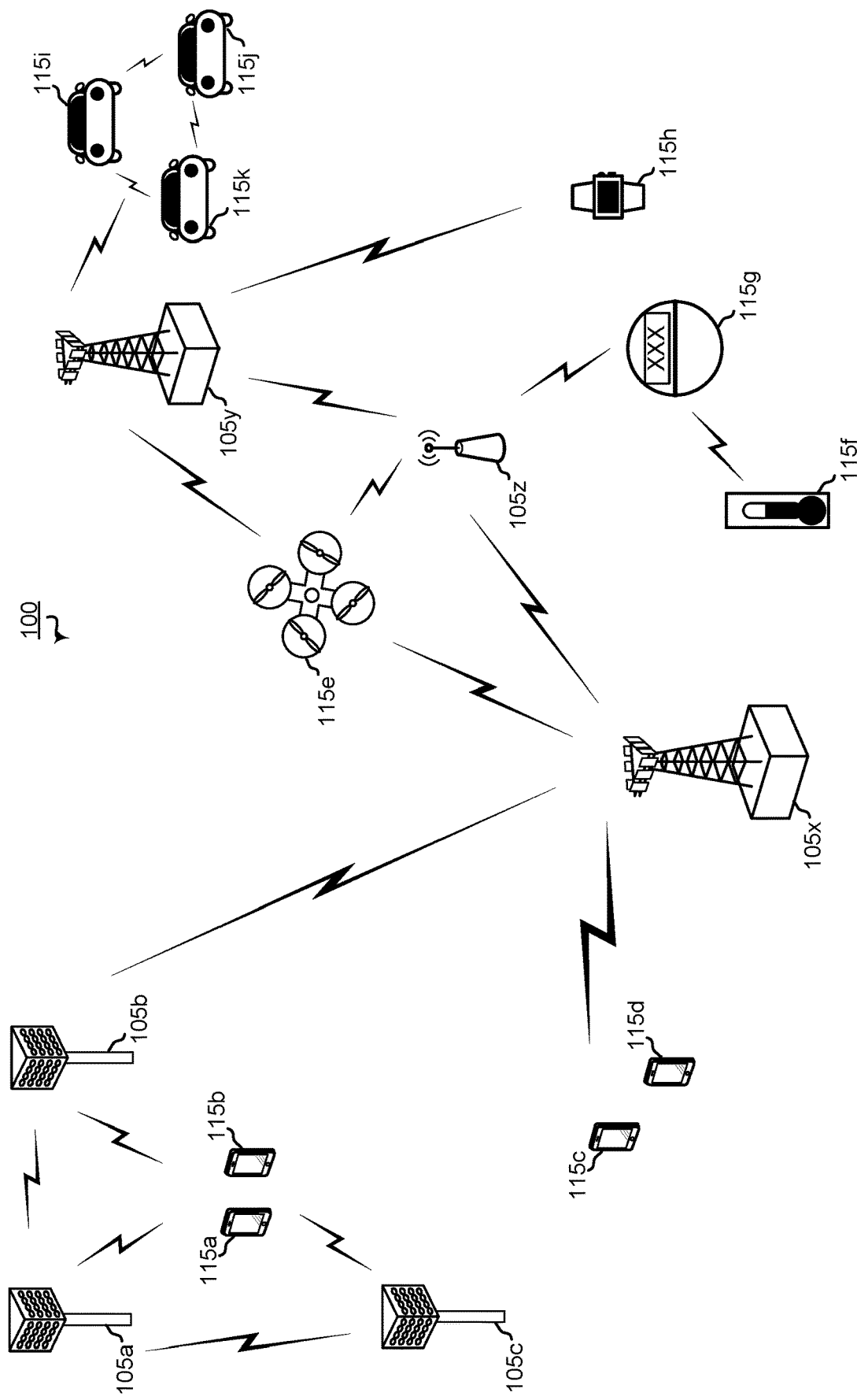
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of RBs and REs are described in the 3GPP specifications.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Wired backhaul communication 134 indicate wired backhaul communications that may occur between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
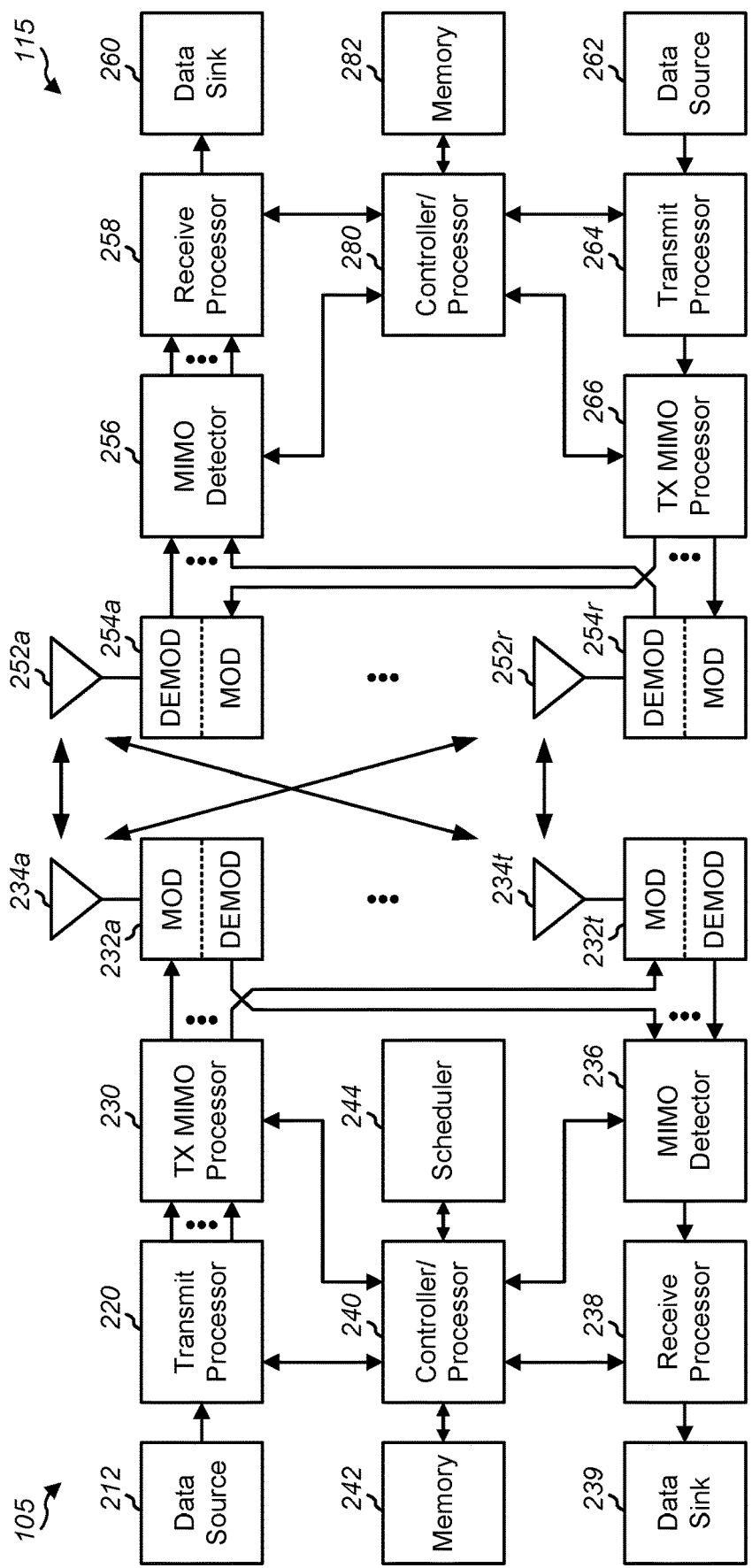
FIG. 2 is a block diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115h, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIGS. 9 and 10, and/or other processes for the techniques described herein. The memories 242 and 282 may store data and program codes for the eNB 105 and the UE 115, respectively. A scheduler 244 may schedule UEs for data transmission on the downlink and/or uplink.

Figure 3:
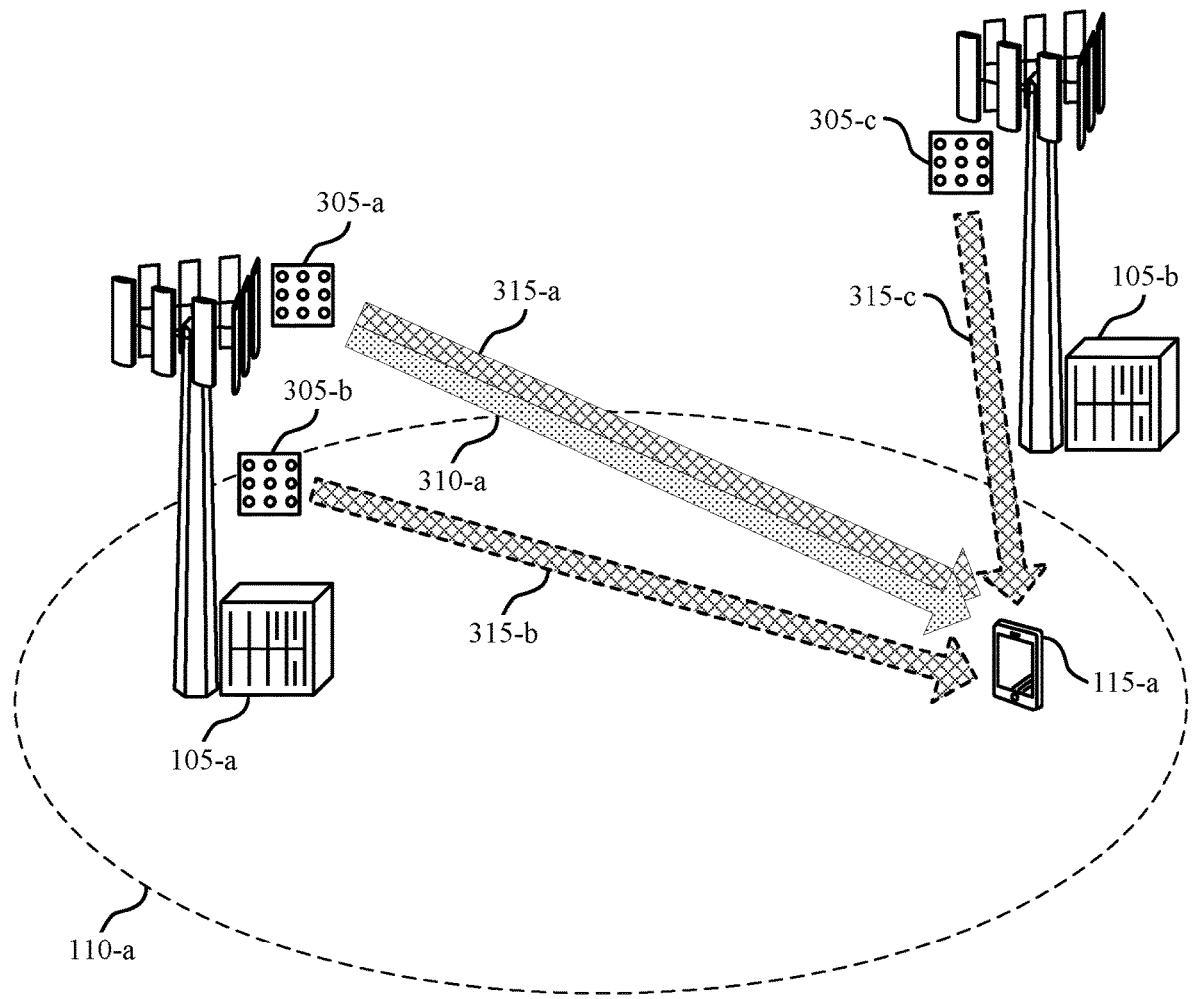
FIG. 3 is a diagram illustrating an example of a wireless communication system that multi-transmission/reception point (TRP) schemes in accordance with aspects of the present disclosure

FIG. 3 illustrates an example of a wireless communications system 300 that supports dynamic switching between different multi-TRP schemes in accordance with aspects of the present disclosure. In some examples, wireless communications system 300 may implement aspects of wireless communication system 100. For example, wireless communications system 300 may include multiple UEs 115 and base stations 105. The base stations 105 may communicate with the UEs 115 using TRPs 305. Each base station 105 may have one or more TRPs 305. For example, base station 105-a may include TRP 305-a and TRP 305-b, while base station 105-b may include TRP 305-c. UE 115-a may communicate with the network using a single TRP 305, using multiple TRPs 305 corresponding to a single base station 105 (e.g., TRPs 305-a and 305-b at base station 105-a), or using multiple TRPs 305 corresponding to multiple different base stations 105 (e.g., TRP 305-a at base station 105-a and TRP 305-c at base station 105-b, where base stations 105-a and 105-b may be connected via a backhaul connection).

In a communication scheme that includes multiple TRPs 305, a single DCI message may configure the communications for the multiple TRPs 305. In an example, base station 105-a may communicate using a first TRP 305-a and a second TRP 305-b. Base station 105-a may transmit DCI using TRP 305-a on a PDCCH 310-a to UE 115-a. The DCI may include communication configuration information for the TCI state(s). The TCI state(s) may determine whether the communications correspond to single TRP communication or multiple TRP communication. The TCI state(s) may also indicate the type of communication scheme (e.g., TDM, FDM, SDM, etc.) configured for the communication. If the TCI configuration is one TCI state, the one TCI state may correspond to single TRP communication. If the TCI configuration is multiple TCI states, the multiple TCI states may correspond to communication with multiple TRPs. In some cases, the wireless communications system 300 may support up to M candidate TCI states for the purpose of quasi-co-location (QCL) indication. Of these M candidates (e.g., 128 candidate TCI states), a subset of TCI states may be determined based on a medium access control (MAC) control element (CE). The MAC-CE may correspond to a certain number (e.g., $2^N$, such as 8 TCI states) of candidate TCI states for PDSCH QCL indication. One of these $2^N$ TCI states can be dynamically indicated in a message (e.g., DCI) using N bits.

The DCI on the PDCCH 310-a may schedule PDSCH 315-a transmissions from TRP 305-a for single TRP communication configurations. Alternatively, the DCI on the PDCCH 310-a may schedule a single PDSCH with multiple PDSCH transmission occasions. To illustrate, the DCI may schedule multiple PDSCH 315 transmission occasions from multiple TRPs 305. For example, the DCI may schedule PDSCH 315-a transmission occasions from TRP 305-a and PDSCH 315-b transmission occasions from TRP 305-b, or PDSCH 315-a transmission occasions from TRP 305-a and PDSCH 315-c transmission occasions from TRP 305-c for multiple TRP communication configurations. A UE 115 may be configured with a list of different candidate TCI states for the purpose of QCL indication. The QCL indication may also indicate DMRS in the DCI corresponding to the PDSCH 315. Each TCI code point in a DCI may correspond to one or more QCL relationships (e.g., corresponding to one or more reference signal (RS) sets) and, accordingly, one or more TCI states. The same TB may be transmitted in each of the transmission occasions.

In cases where the network communicates with a UE 115 with TRPs 305, whether in a single TRP configuration or a multiple TRP configuration, there may be multiple different schemes with which to communicate with the TRP(s) 305. The TRP communication scheme may be determined by the TCI states. The TCI state(s) for communication on the PDSCH 315 may be indicated in the DCI by one or more bits, where the one or more bits indicate a TCI code point. The TCI code point in the DCI can correspond to one or more TCI states (e.g., either one or two TCI states). If the TCI code point in the DCI indicates one TCI state, the UE 115 is configured for single TRP operation. If the TCI code point in the DCI indicates two TCI states (and, correspondingly, two QCL relationships), the UE 115 is configured for multiple TRP operation. For example, if two TCI states are active within a TCI code point, each TCI state may correspond to one code division multiplexing (CDM) group.

In a first example multi-TRP scheme, TRPs 305 may communicate by utilizing SDM. In this case, different spatial layers may be transmitted from different TRPs 305 on the same RBs and symbols. Each TCI state may also correspond to different DMRS port groups. The DMRS ports in a DMRS CDM port group may be QCLed. This may allow a UE 115 to estimate each channel separately. In SDM, each antenna port used on the downlink may belong to a different CDM group. Base station 105-a may indicate the antenna port groups using an antenna port(s) field in DCI.

The SDM scheme may include different TCI states within a single PDSCH in a given slot, where the TCI states overlap in time, frequency, or both. Different groups of spatial layers (which may correspond to different TCI states) may use the same modulation order. Cases where multiple groups use the same modulation order may be signaled through the modulation and coding scheme (MCS). In some cases, base station 105-*a* may indicate the MCS in the DCI. In cases where the different groups of spatial layers use different modulation orders, each of the different modulation orders may be signaled to UE 115-*a*. Different DMRS port groups may correspond to different TRPs, QCL relationships, TCI states, or a combination thereof.

In other examples of multi-TRP schemes, TRPs 305 may communicate with UE 115-*a* by utilizing FDM and/or TDM communication schemes. In an FDM scheme, one set of RBs or a set of PRGs may correspond to a first TRP 305-*a* and a first TCI state, and a second set of RBs or PRGs may correspond to a second TRP 305-*b* and a second TCI state. The RBs allocated for each TRP may be distinct from each other, so that each TRP communicates on a designated set of RBs that are distinct form the other set of RBs (but may overlap in the same OFDM symbol). The frequency domain resource assignment field in the DCI may indicate both the first set and the second set or RBs or PRGs. In some cases, base station 105-*a* may use additional signaling in the DCI to indicate which RBs belong to the first set and which belong to the second set. In some cases, the system may support a limited number of possibilities for allocating the frequency resources to the different TRPs (e.g., to reduce the overhead).

In a TDM scheme, a similar table of possibilities may be used to signal the resource allocation for different TRPs. In this case, each TRP is allocated to different sets of OFDM symbols rather than to different sets of RBs. Such a TDM scheme may support TDMed transmissions within a single slot (e.g., transmission time interval (TTI)). In some cases, a TDM scheme may implement slot aggregation, where transmissions using different TCI states may be spread across different slots (e.g., TTIs). In slot aggregation, the transmissions over the different TRPs may use separate rate matching, but may have the same or different modulation orders.

The network may communicate with UE 115-*a* using multiple TRPs and any of the communication schemes described herein. Further, some communication schemes may include a combination of TDM and FDM, or cases where TDM may or may not be in a slot aggregation configuration. The schemes may also include some cases where rate matching is joint and some cases where rate matching is separate for different TRPs, and the schemes may also include cases where the different TRPs have the same or different modulation orders. Each scheme may also utilize different parameters that are included in signaling, such as which DMRS ports are used (e.g., for an SDM scheme) or how RBs are split up (e.g., for an FDM scheme).

To efficiently configure UE 115-*a* with the TCI state information—and the corresponding TRP scheme—base station 105-*a* may generate bits for a DCI message and may transmit the DCI on PDCCH 310-*a*. The DCI message may be transmitted to UE 115-*a* using TRP 305-*a*. UE 115-*a* may determine which scheme is configured for communication with TRPs 305 based on one or more fields of the received DCI. The DCI may be the same size across all communication schemes, and the formatting (e.g., number of bits) of DCI fields may remain the same across the communication schemes.

In a first implementation, UE 115-*a* may detect the communication scheme based on the antenna port(s) field and the TCI field of the received DCI message. The TCI field of the DCI may signify whether communication with one TRP using one TCI state is configured (e.g., TRP 305-*a*) or communication with multiple TRPs using multiple TCI states is configured (e.g., TRP 305-*a* and TRP 305-*b*). For example, a value (e.g., tci-PresentInDCI) in the TCI field may not be configured for the CORESET scheduling the PDSCH, or the value may correspond to one TCI state. The MAC-CE may configure the TCI state possibilities, and the TCI field of the DCI may indicate the possibility based on the configuration by the MAC-CE. Different values in the TCI state field may correspond to either single TRP communication (e.g., communication with TRP 305-*a* if a single TCI state is indicated) or multiple TRP communication (e.g., communication with TRPs 305-*a* and 305-*b*, 305-*a* and 305-*c*, etc. if two TCI states are indicated).

UE 115-*a* may determine whether the DCI indicates a single TRP communication scheme or a multiple TRP communication scheme based on the value in the TCI field and may interpret the value in the antenna port(s) field of the DCI based on the TCI field value. In cases where the TCI field corresponds to a communication scheme with a single TRP 305, such as TRP 305-*a*, the UE 115-*a* may identify the value of the antenna port(s) field for a single TCI state. Based on a table in memory, UE 115-*a* may determine one or more antenna ports for the scheduled PDSCH 315-*a* transmission based on the antenna port(s) field value. In cases where the TCI field corresponds to a communication scheme with multiple TRPs 305, such as TRP 305-*a* and TRP 305-*b*, the UE 115-*a* may identify the value of the antenna port(s) field and determine a multi-TRP scheme based on the value. In an example, the antenna port(s) field value may correspond to one or more DMRS ports, a communication scheme, a rate matching configuration, scheme-specific parameters, or some combination of these.

In a second implementation, the UE 115-*a* may determine the communication scheme based on a field explicitly indicating the scheme in a DCI message (e.g., a multi-TCI-scheme field). The value in the multi-TCI scheme field may correspond to a specific multi-TCI scheme (e.g., SDM, FDM, or TDM). If the value in the multi-TCI scheme field corresponds to a TDM scheme, the value may additionally indicate if the TDM scheme is configured for one slot or for multiple slots based on a slot aggregation procedure.

In one example, the UE 115-*a* may identify a value for the TCI field in the DCI message and may determine whether the communication scheme includes multiple TCI states based on the TCI field value. If the value does not correspond to multiple TCI states, then the UE 115-*a* may ignore (e.g., not process) the multi-TCI state field. In some cases, the value of the multi-TCI scheme field may only be relevant in cases where the TCI field in the DCI corresponds to more than one TCI state.

In a second example, the UE 115-*a* may determine whether the communication scheme includes multiple TCI states based on the multi-TCI state field. For example, a particular value of the multi-TCI state field may correspond to a single TCI state, while the other values may correspond to different multiple TCI scheme possibilities. In this example, the UE 115-*a* may interpret the TCI field based on whether the multi-TCI state field indicates single or multiple TRP operation. For example, the same TCI code point in the TCI field may correspond to either one TCI state or a pair of TCI states based on whether the multi-TCI state field indicates single or multiple TRP operation. In this way, a three-bit TCI field may support eight different single TCI state options and eight different pairs for multiple TCI state options.

The UE 115-*a* may interpret the value received in the multi-TCI state field based on a table. For example, the value may indicate a certain TRP communication scheme, a rate matching configuration, one or more scheme specific parameters, a modulation order, or any combination of these.

In some cases, different modulation orders are used in different TCI states. The table referenced above may include an additional or alternative column indicating a modulation order for the second TCI state in a multi-TCI scheme. This modulation order value may be an absolute modulation order or may be a relative modulation order with respect to modulation order for the first TCI state in the multi-TCI scheme.

In some cases, the UE 115-a may interpret the antenna port(s) field in the DCI message based on the multi-TCI scheme field. In some examples, UE 115-a may determine based on the two fields that a single TRP configuration is used, or that a multiple TRP configuration with TDM or FDM is used. In these examples, UE 115-a may determine the antenna ports scheme based on a table supporting a single TCI state (or based on no SDM). In other examples, UE 115-a may determine that a multiple TRP configuration with SDM is used. In these other examples, UE 115-a may determine the antenna ports scheme based on a table supporting multiple antenna ports for multiple TCI states.

In other cases, the UE 115-a may use both the antenna port(s) field and the multi-TCI scheme field to determine the communication scheme. For example, UE 115-a may determine whether the multi-TCI scheme is an SDM scheme based on the antenna port(s) field. If not, UE 115-a may determine whether the multi-TCI scheme is an FDM or TDM scheme based on the multi-TCI scheme field.

In a third implementation, the UE 115-a may determine RVs for the PDSCH 315 transmissions based on the DCI. For example, base station 105-a may identify a transport block for transmission to UE 115-a. Base station 105-a may encode the transport block and transmit coded bits using TRP 305-a and TRP 305-b. If base station 105-a performs joint rate matching, the coded bits for both TCI states may be the same, corresponding to one RV. If base station 105-a performs separate rate matching, the coded bits for each TCI state may be different, corresponding to two different RVs. Base station 105-a may indicate the one or more RVs in the single DCI message on the PDCCH 310-a. If indicating one RV (e.g., for a single TCI operation or when performing joint rate matching), base station 105-a may indicate the one RV in an RV field in the DCI. If indicating multiple (e.g., two) RVs, base station 105-a may indicate a pair of RVs in one or more DCI fields.

In a first example, a first RV may be indicated in the RV field of the DCI and a second RV may be indicated in another field in the DCI. For example, the second RV may be indicated in the antenna port(s) field of the DCI, the multi-TCI scheme field of the DCI, or some combination of these.

In a second example, the antenna port(s) field or the multi-TCI scheme field of the DCI as described herein may indicate a rate matching configuration. If the UE 115-a determines that the base station 105-a performed separate rate matching, the UE 115-a may interpret the value in the RV field to indicate separate RV values for the different TCI states. For example, the value of the RV field may correspond to an RV pair, where the first RV value in the pair may correspond to a first TCI state and the second RV value in the pair may correspond to a second TCI state. The value-to-RV pair correspondence may be specified in a table (e.g., a lookup table). This table may be pre-configured in memory at the UE 115-a and base station 105-a, or the network may configure UE 115-a with the table.

In a third example, the rate matching configuration may also be indicated in the RV field. For example, the value of the RV field may correspond to either a single RV or multiple RVs, as shown in the example RV table below. In some cases, UE 115-a may use this table to interpret the RV field when determining that a multi-TRP scheme is configured. This table may be specified as a lookup table and may be pre-configured or dynamically configured by the network. If the value of the RV field corresponds to a single RV value for multi-TRP operation, UE 115-a may determine that the base station 105-a is performing joint rate matching. If the value of the RV field corresponds to a pair of RV values for multi-TRP operation, UE 115-a may determine that the base station 105-a is performing separate rate matching.

In a fourth implementation, the UE 115-a may determine how to interpret an indication of PRG size in the DCI based on the configured multi-TRP scheme. If the UE 115-a determines that the multi-TCI scheme is an FDM scheme (e.g., based on either the antenna port(s) field or the multi-TCI field), then the UE 115-a may interpret the PRB bundling size indicator field in the DCI per TCI state, as opposed to per bandwidth part. For example, if the PRB bundling size indicator field indicates wideband precoding, the wideband precoding configuration may include wideband communication only within RBs associated with a same TCI state.

It is to be understood that wireless communications system 300 may implement any combination of the implementations described herein to dynamically signal the TCI states for a selected multi-TRP scheme in a single DCI message.

Figure 4:
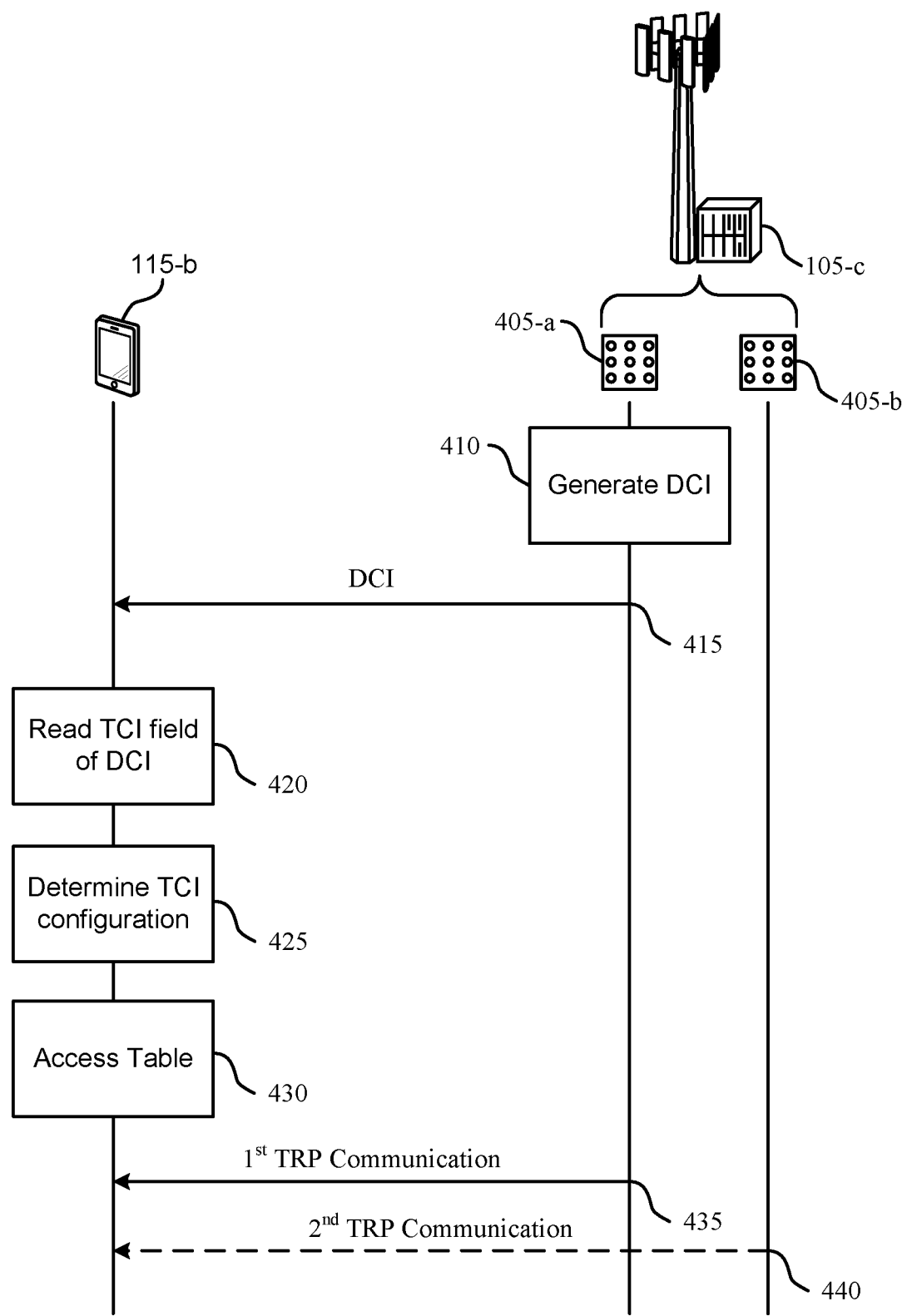
FIG. 4 is a block diagram illustrating an example of a process flow that support dynamic switching between different multi-TRP schemes in accordance with aspects of the present disclosure.

FIG. 4 illustrates an example of a process flow 400 that supports dynamic switching between different multi-TRP schemes in accordance with aspects of the present disclosure. In some examples, process flow 400 may implement aspects of a wireless communications system 100 or 300. For example, a base station 105 and UE 115, such as base station 105-c and UE 115-b, may perform one or more of the processes described with reference to process flow 400. Base station 105-c may communicate with UE 115-b by transmitting and receiving signals through TRPs 405-a and 405-b. In other cases, TRPs 405-a and 405-b may correspond to different base stations 105. Alternative examples of the following may be implemented, where some steps are performed in a different order than described or are not performed at all. In some cases, steps may include additional features not mentioned below, or further steps may be added.

At 410, base station 105-c may generate DCI. The generation may include generating a first set of bits (e.g., a TCI field) that may indicate a set of TCI states for communication with UE 115-b. The generation may also include generating a second set of bits (e.g., an antenna port(s) field) that may indicate a set of antenna ports and, in some cases, a multi-TRP communication scheme for multiple TRP communication operation. In some cases, the second set of bits may additionally indicate a modulation order for at least one TCI state (e.g., a second TCI state for TRP 405-b), an RV for a TB for at least one TCI state (e.g., the second TCI state for TRP 405-b), or a combination thereof.

At 415, base station 105-c may transmit the generated DCI to UE 115-b. UE 115-b may receive the DCI from base station 105-c. The DCI may be transmitted on a PDCCH from TRP 405-a. The DCI may schedule upcoming PDSCH transmissions and may include other control information. The DCI may include an indication of the first set of bits and the second set of bits. For example, the DCI may include coded bits based on the first set of bits and the second set of bits.

At 420, UE 115-b may read the TCI field (e.g., the first set of bits) received in the DCI message. UE 115-b may identify, using the first set of bits, one or more TCI states for communication with base station 105-c using one or more TRPs 405.

At 425, UE 115-b may determine the TCI state configuration based on reading the TCI field of the DCI. For example, a value (e.g., tci-PresentInDCI) in the TCI field may not be configured for the CORESET scheduling the PDSCH, or the value may correspond to one TCI state. In these cases, the communication scheme may be configured for one TRP. In other cases, the TCI field value may correspond to more than one TCI state. In these other cases, the communication may be configured for communication with multiple TRPs.

UE 115-b may read the antenna port(s) field of the DCI and may interpret the value of the field based on the determined TCI state configuration. For example, if UE 115-b determines that the TCI field indicates a single TCI state, UE 115-b may identify, using the second set of bits, a set of antenna ports for the PDSCH transmission. At 430, UE 115-b may access a table (e.g., pre-configured in memory or configured by the network) to determine one or more antenna ports corresponding to the antenna port(s) field value.

Alternatively, if UE 115-b determines that the TCI field indicates multiple TCI states, UE 115-b may identify, using the second set of bits, a set of antenna ports and a multi-TRP communication scheme based on identifying the set of TCI states. The second set of bits may include the same number of bits whether the field indicates just the set of antenna ports for single TRP operation or the set of antenna ports and the multi-TRP scheme for multi-TRP operation. At 430, UE 115-b may access a lookup table to determine the set of antenna ports and multi-TRP scheme based on the antenna port(s) field value. In some cases, UE 115-b may select the lookup table from a set of lookup tables, where the set may include one lookup table to use for single TRP operation and one lookup table to use for multiple TRP operation.

The lookup table may include information mapping both the set of antenna ports and the multiple TRP scheme to the second set of bits. In some cases, the lookup table mapping both the set of antenna ports and the multiple TRP communication scheme to the second set of bits may be preconfigured in memory, and in some cases it may be dynamically configured by base station 105-c. UE 115-b may identify the second set of antenna ports and multiple TRP schemes based on the selected lookup table. In the lookup table for multi-TRP operation, along with indications of the DMRS ports, the table may include indications of the multiple TRP scheme (e.g., SDM, FDM, TDM, or some combination thereof). The antenna port(s) field lookup table may indicate that a value in the antenna port(s) field of the DCI corresponds to a set of DMRS ports, where the set of DMRS ports further corresponds to a communication scheme, such as SDM or FDM. The antenna port(s) field value may also indicate if rate matching is joint or separate. If the antenna port(s) field value indicates the use of an FDM communication scheme, the table may additionally indicate an RB configuration for the FDMed TCI states, as shown in the "Possibility" column of the table below. If the lookup tables are configurable by the network, then the network may define the sets of possible DMRS ports and the type of schemes using radio resource control (RRC) signaling.

In some cases, UE 115-b may identify, using the second set of bits, a modulation order for at least one TCI state of the set of possible TCI states. Different modulation orders may also be used across different TCI states. A first modulation order may be indicated in a modulation order field. The first modulation order may correspond to a first TCI state in a multi-TRP operation. A second modulation order may be indicated in one of the tables above based on the received value for the antenna port(s) field. For example, a column in the antenna port(s) field lookup table may indicates if the modulation order corresponding to the second TCI state is the same as the modulation order indicated in the MCS (i.e., the modulation order for the first TCI state). If the modulation order is not the same as the modulation order indicated in the MCS, then the value of the modulation order for the second TCI state may be indicated in the antenna port(s) field. The value of the modulation order may be an absolute value or may be a relative value with respect to the first modulation order.

If the TCI state configuration is determined to indicate communication with a single TRP, then UE 115-b may receive a transmission from one TRP 405-a at 435. UE 115-b may communicate with the single TRP 405-a based on the determined communication scheme.

If the TCI state configuration is determined to indicate communication with multiple TRPs 405, UE 115-b may receive a transmission from one TRP 405-a at 435 and may also receive a transmission from another TRP 405-b at 440 (where, in some cases, 435 and 440 may correspond to a same time or OFDM symbol). UE 115-b may communicate with the network via the multiple configured TRPs 405 based on the determined communication scheme. Although downlink (PDSCH) multiple TRP operations are illustrated in FIGS. 3 and 4, in other implementations uplink (PUSCH) multiple TRP operations may be used in addition to or in the alternative of such downlink operations. To illustrate, a UE may transmit PUSCH transmissions to one or more TRPs and/or base stations.

Systems and methods described herein are directed to signaling for PDSCH and PUSCH repetitions such that a repetition, i.e., a nominal repetition, can be divided or split across a slot transition or a slot boundary. The systems and methods described herein enable PDSCH/PUSCH repetition over multiple TCI states and/or over multiple Sounding Reference Signal (SRS) Resource Indicators (SRIs). Accordingly, such systems and methods can be utilized for URLLC and/or Multiple TRP modes.

For example, when operating in a URLLC mode, such as Section 6.3 of 3GPP Specification Number TS 38.214 (version 16) for an enhanced URLLC mode (eURLLC), a TRP (e.g., base station) can signal to a receiving device (e.g., UE) how to handle splitting of a PUSCH across a slot boundary. Section 6.3 of Specification Number TS 38.214 (version 16) is directed to enabling a PUSCH transmission instance to be split across a slot boundary when the remaining or unused symbols left in a slot are not enough to support the entire PUSCH transmission instance. Option 4 of Section 6.3 (Section 6.3.3) is directed to enabling one or more actual PUSCH repetitions in one slot or two or more actual PUSCH repetitions across a slot boundary in consecutive available slots. Such PUSCH repetitions are supported using one UL grant for dynamic PUSCH and one configured grant configuration for configured grant PUSCH. When operating in a Single TRP mode, a base station (e.g., a single antenna or TRP thereof) can signal to a receiving device (e.g., UE) a number of repetitions and the UE can split a repetition that would not fit in a portion of one slot across two slots when transmitting PUSCH repetitions to the base station.

As an example of operating in a Multiple TRP mode (e.g., a eURLLC multiple TRP mode), a TRP (e.g., a TRP of a base station) can signal to a receiving device (e.g., UE) how to handle multiple beams (e.g., in multiple PDSCH repetitions or PUSCH repetitions) over multiple TCI states or SRIs. For example, a TRP can schedule or signal PDSCH repetitions over multiple TCI states or schedule or signal multiple PUSCH repetitions over multiple SRIs. However, there is currently no process to handle when a repetition, i.e., a nominal repetition, crosses a slot split or slot boundary in such modes. A slot split or slot gap is a change in a direction of a set of symbols in a slot. For example, a change from a downlink symbol to an uplink symbol may cause a repetition to not fit in an otherwise useable gap. Accordingly, bandwidth is underutilized or wasted and latency may increase and reliability and/or redundancy may decrease.

In some of the implementations described herein, a TRP (e.g., a base station) signals multiple TCI states/SRIs and RVs for nominal repetitions in a downlink control message, such as DCI or RRC signaling. As explained above TCI states may indicate or enable multiple TRP modes and communications. Thus, by enabling support of multiple TCI states for the repetitions (e.g., one for each nominal repetition), a UE can receive PDSCH repetitions that can be split for multiple TRPs, which may be multiple TRPs of a single base station or TRPs of multiple base stations. Similarly, by enabling support of multiple SRIs for PUSCH repetitions, a UE can transmit PUSCH repetitions that can be split to multiple TRPs. The receiving device (e.g., UE) identifies an actual amount of repetitions based on the amount of nominal repetitions and the configuration of the slot, such as slot length and symbol orientation. The receiving device (e.g., UE) then translates or converts a sequence of the received multiple TCI states/SRIs and RVs for each nominal repetition into a sequence of the multiple TCI states/SRIs and RVs for the actual repetitions. In a particular implementation, the receiving device may insert duplicate values for each part of a nominal repetition that is split (e.g., such as corresponding actual repetitions).

In other implementations, the receiving device receives an amount of nominal repetitions in the downlink control message, and may not receive multiple TCI states/SRIs and RVs for each nominal repetition. The receiving device identifies an actual amount of repetitions based on the amount of nominal repetitions and the configuration of the slot, such as slot length and symbol orientation, similar to the above implementation. The receiving device then generates a sequence of the multiple TCI states/SRIs and RVs for the actual repetitions based on the amount of actual repetitions and a cyclic pattern (e.g., 0, 1, 2, 3, 0, 1, 2, 3, etc.). In some such implementations, each of the TCI state/SRI and the RV have their own pattern. The pattern for TCI state/SRI and the pattern for RV may be the same or different. In other such implementations, the TCI state/SRI and the RV have a joint pattern. Accordingly, such systems and methods can support splitting of PDSCH or PUSCH repetitions to further increase reliability and reduce latency over existing solutions which cannot support splitting of PDSCH or PUSCH repetitions.

Figure 5A:
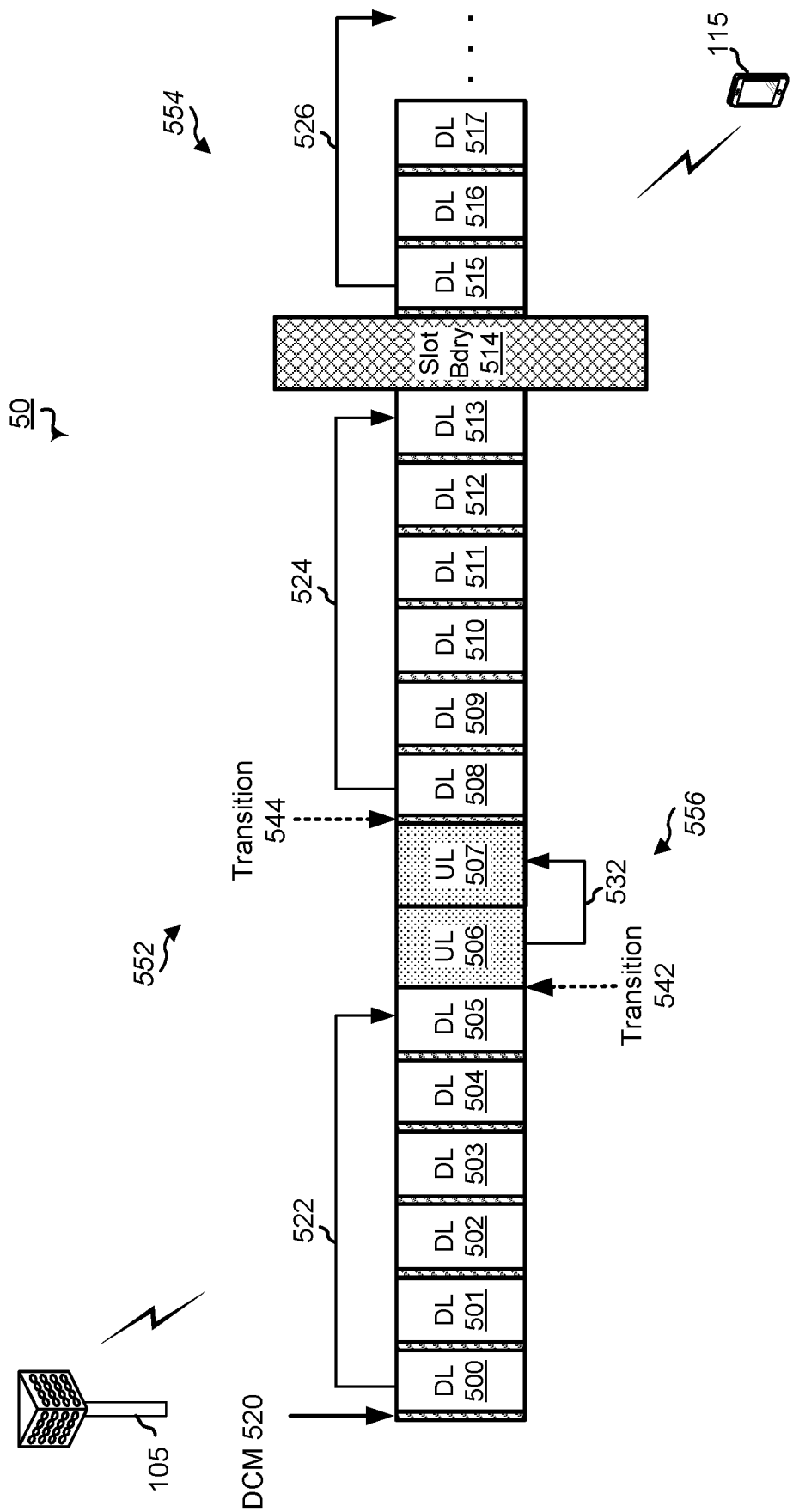
FIG. 5A is a block diagram illustrating an exemplary portion of an NR network in which communications occur between a base station and UE each configured according to aspects of the present disclosure.
Figure 5B:
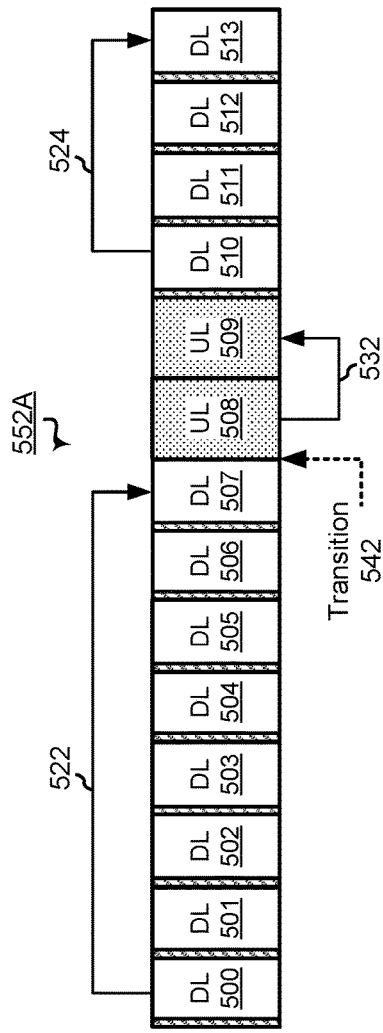
FIGS. 5B-5D are each block diagram illustrating an example slot symbol format.
Figure 5C:
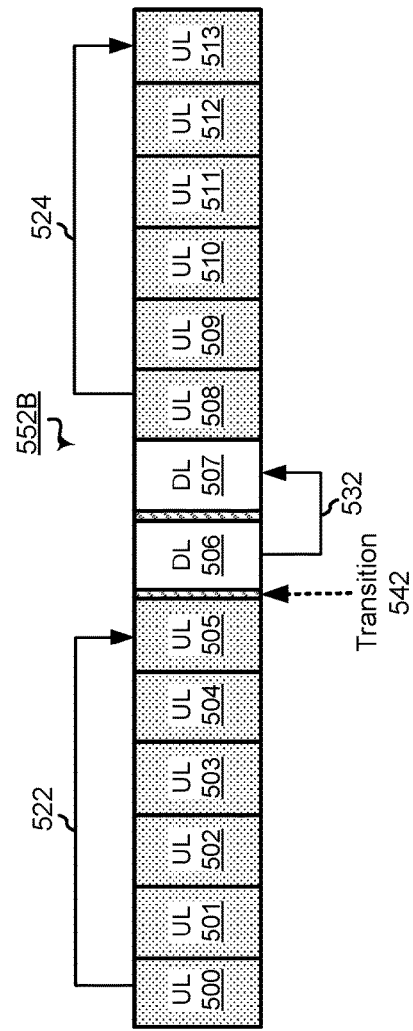
Figure 5D:
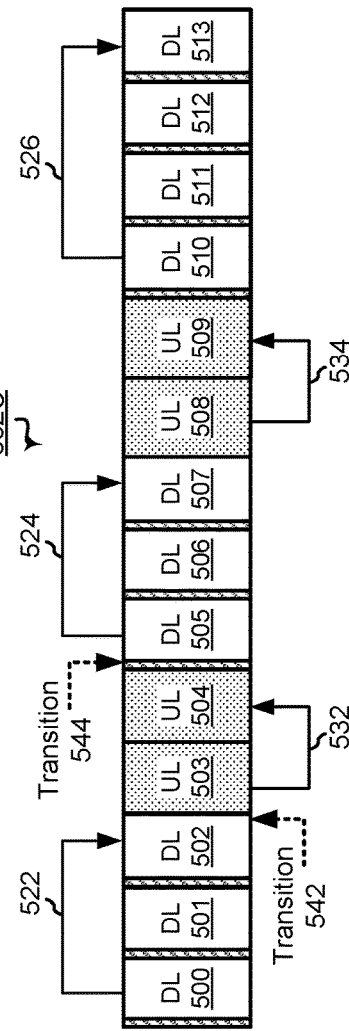

Referring to FIGS. 5A-5D, block diagrams illustrating different slot formats are depicted. In FIG. 5A, a first slot format is shown in context of a wireless network. FIGS. 5B-5D, depict alternative slot symbol formats illustrating various slot splits (aka slot transitions or symbol conflicts).

Referring to FIG. 5A, a block diagram illustrating a portion of new radio (NR) network 50 in which communications occur between base station 105 and UE 115 each configured according to aspects of the present disclosure is illustrated. NR network 50 may include unlicensed or contention-based spectrum, such as in NR unlicensed spectrum (NR-U) or NR shared spectrum (NR-SS) operations. The communications illustrated between base station 105 and UE 115 includes multiple transmission opportunities (TxOPs) or channel occupancy times (COTs) including downlink and uplink symbols 500-513 of a first slot 552 and symbols (e.g., downlink symbols 515-517) of a second slot 554. A slot boundary 514 separates the first set of symbols (e.g., 500-513) of the first slot 552 from the second set of symbols (e.g., 515-517) of the second slot 554. Additionally, a slot split 556 is illustrated within the first slot 552. A slot split includes or corresponds to a change in direction (i.e., uplink or downlink) of symbols in a slot. As illustrated in FIG. 5, the slot split 556 is caused by a change from a downlink symbol (i.e. sixth symbol 505) to an uplink symbol (i.e., seventh symbol 506).

Slot splits may be determined by determining symbol conflicts/invalid symbols in some implementations. For example, a device (e.g., UE) determines a set of invalid symbols, and then each nominal repetition is divided into one or more actual repetitions after removing the invalid symbols from the nominal repetition. The set of invalid symbols may be determined based on semi-static DL symbols. To illustrate, a pattern(s) of invalid symbols may be configured by RRC, and an indication in the DCI (e.g., one bit in the DCI) indicates to the UE whether or not to consider that pattern(s) for the determination of the invalid symbols.

In some implementations, PDSCH or PUSCH repetitions are transmitted during one or more slots. The PDSCH or PUSCH repetitions may include or take up multiple symbols of a slot. In conventional NR-U or NR-SS operations, PDSCH or PUSCH repetitions are transmitted between slot splits and boundaries and must fit in between such gaps. Exemplary gaps 522-526 and 532 are illustrated in FIG. 5A. In the aspects described herein, PDSCH or PUSCH repetitions can be split over the slot splits and boundaries and need not fit between such gaps. Accordingly, the PDSCH or PUSCH repetitions described herein can utilize more, or all, of the symbols corresponding symbols of the slot. For example, PDSCH repetitions can utilize all downlink symbols in the first slot 552 independent of the size of the PDSCH repetitions matching the available downlink gaps 522 and 524.

At or by downlink control message 520, base station 105 identifies or indicates control information for upcoming PDSCH or PUSCH repetitions. The control information may include or correspond to an amount of PDSCH and/or PUSCH repetitions (nominal or actual), TCI state information, SRI information, RV information, pattern information, or a combination thereof. Accordingly, the UE 115 may determine reception and/or transmission information for upcoming PDSCH or PUSCH repetitions based on the control information of DCM 520.

Referring to FIG. 5B, a first alternative slot format 522A is illustrated. In FIG. 5B, the slot format 552A includes gaps 522, 524, and 532. As compared to the slot format of first slot 552, the slot format 552A includes a longer first gap 522 (i.e., has more symbols before first transition 542). Alternatively, the slot format 552A may include only one transition in other implementations. For example, the slot format 552A may have the remaining symbols (508-513) after the first transition 542 all be uplink symbols.

Referring to FIG. 5C, a second alternative slot format 552B is illustrated. In FIG. 5C, the slot format 552B includes gaps 522, 524, and 532. As compared to the slot format of the first slot 552 and the slot format 552A, the slot format 552B includes a first transition 542 from uplink symbols to downlink symbols. As illustrated in FIG. 5B, the first transition 542 may occur earlier or later than as illustrated in FIG. 5C, i.e., prior to symbol 506 or after symbol 506.

Referring to FIG. 5D, a third alternative slot format 552C is illustrated. In FIG. 5D, the slot format 552C includes gaps 522-526, 532, and 534. As compared to the previously described slot formats, the slot format 552C includes more transitions between uplink symbols and downlink symbols, i.e., four transitions (e.g., 542, 544). Slot format 552C may support three splits (intra-slot splits) for PDSCH repetitions and two splits (intra-slot splits) for PUSCH repetitions. The slot formats illustrated in FIGS. 5B-5D also may support inter-slot splits, i.e., a split caused by a slot boundary, as described with reference to FIG. 5A and described further with reference to FIGS. 6A-6D.

Figure 6A:
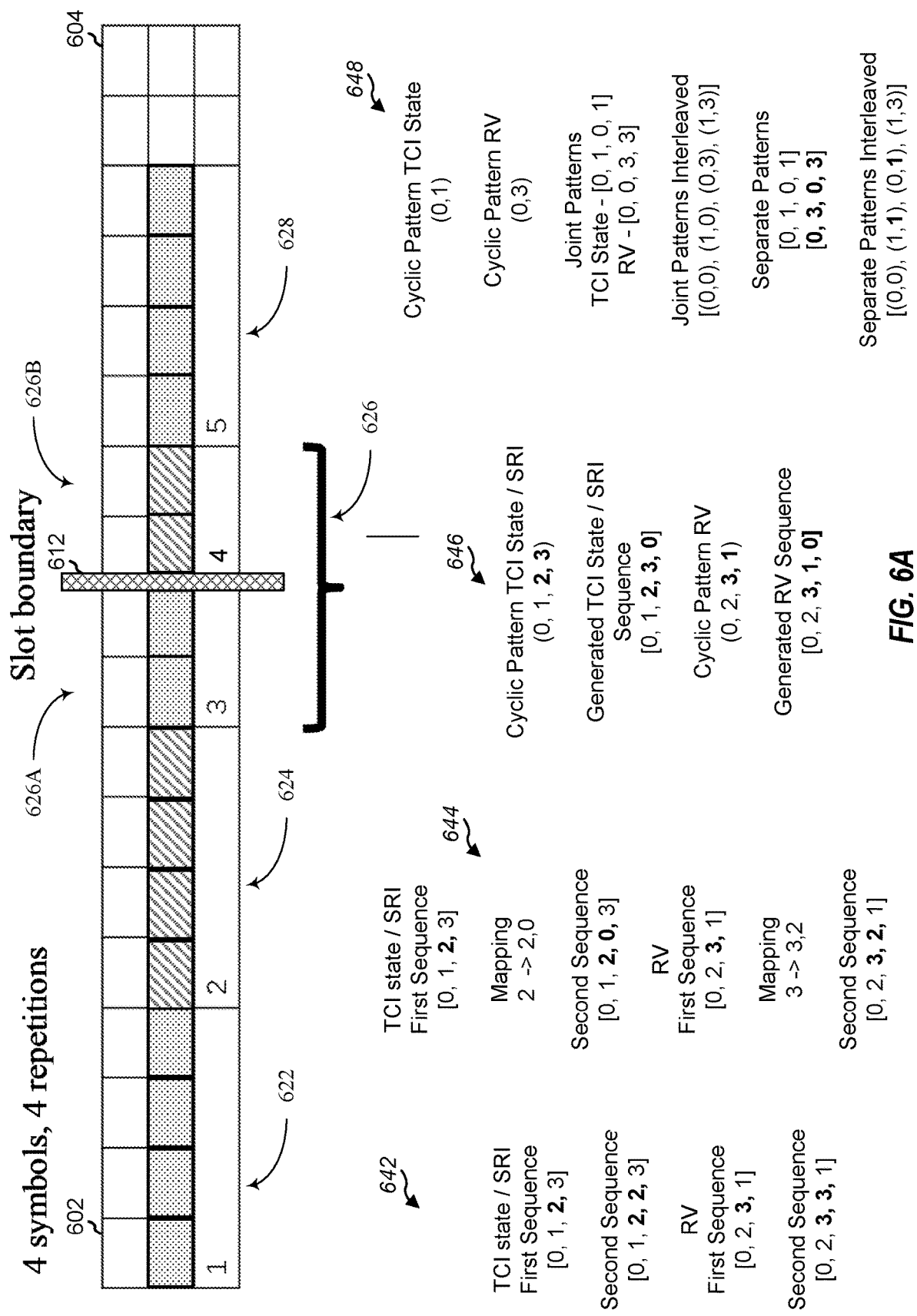
Figure 6B:
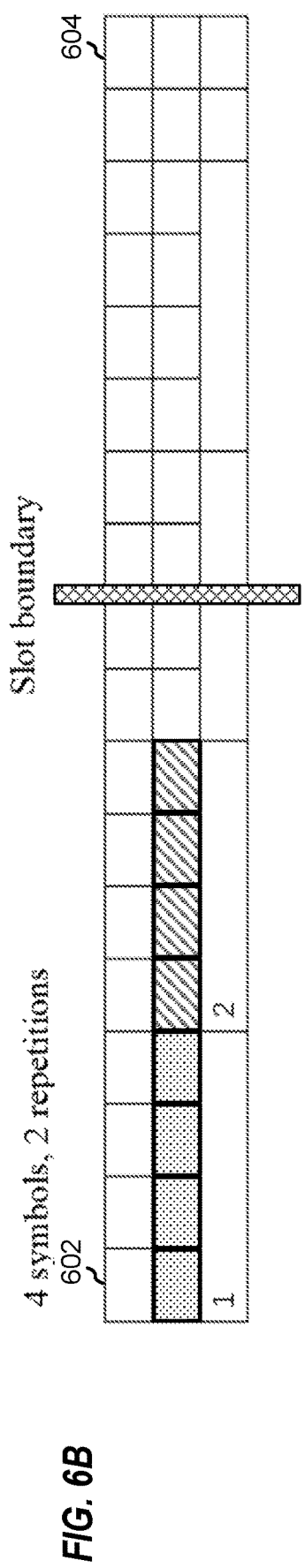
Figure 6C:
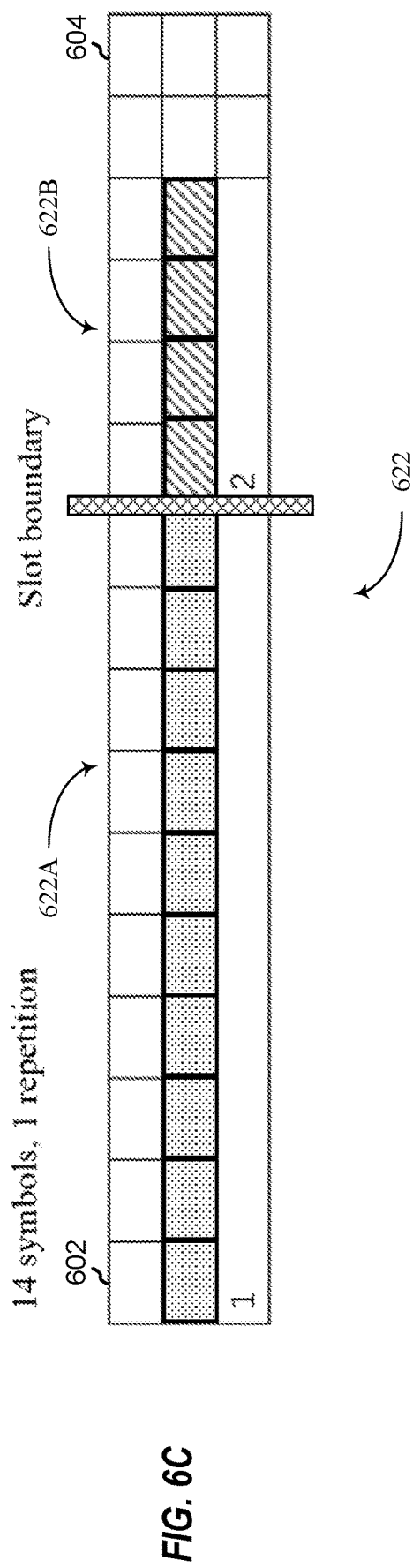

Referring to FIGS. 6A-6D, block diagrams illustrating different repetition formats are depicted. In FIG. 6A, a repetition slot format is shown which includes multiple repetitions and has a repetition split across a slot boundary. FIGS. 6B-6D, depict alternative repetition slot formats illustrating other conditions. In FIGS. 6A-6D an amount of nominal repetitions are depicted in text and the corresponding actual repetitions are depicted graphically with patterning. Additionally, in FIGS. 6A and 6D bolding of numbers is used to emphasize differences in number sequences and/or changes to numbers or the sequence (e.g., insertion of a number).

Referring to FIG. 6A, a first repetition slot format is depicted that includes four repetitions 622-626 (nominal repetitions) where one repetition is split across a slot boundary 612 between first slot 602 and second slot 604. In FIG. 6A, each repetition is 4 symbols in length and each slot 602, 604 is 14 symbols in length, with FIG. 6A depicting the last 10 symbols in the first slot and the first 8 symbols in the second slot. Accordingly, a third repetition 626 would break across the slot boundary 612 if every symbol of the first slot 602 were used. In the aspects described herein, the third repetition 626 (referred to as a third nominal repetition) can be split into two corresponding actual repetitions 626A, 626B (e.g., third and fourth actual repetitions 626A, 626B) and across the slot boundary 612. As illustrated in FIG. 6A, the first and second repetitions 622, 624 (both nominal and actual) are included in the first slot 602, the third actual repetition 626A is included in the first slot 602 and the fourth actual repetition 626B is included in the second slot 604. The fourth nominal repetition 628 (aka a fifth actual repetition) is included in the second slot 604.

Additionally, exemplary schemes and indications for signaling the repetitions are described with reference to FIG. 6A. In FIG. 6A, four signaling schemes are illustrated. A first signaling scheme includes or corresponds to a scheme in which a TCI state value (or SRI value) and/or an RV value after a split is the same as the corresponding nominal repetition. Said another way, the two actual repetitions that correspond to the same nominal repetition which was split have the same TCI state/SRI value and/or the same RV value. As illustrated in example 642, the fourth actual repetition 626B has the same TCI state value (or SRI value) of 2 as the third actual repetition 626A, both of which correspond to the third nominal repetition 626, as indicated the third and fourth bolded members of the second sequence [0, 1, 2, 2, 3]. The fourth actual repetition 626B also has the same RV value of 3 as the third actual repetition 626A, as indicated the third and fourth bolded members of the second sequence [0, 2, 3, 3, 1].

Figure 8A:
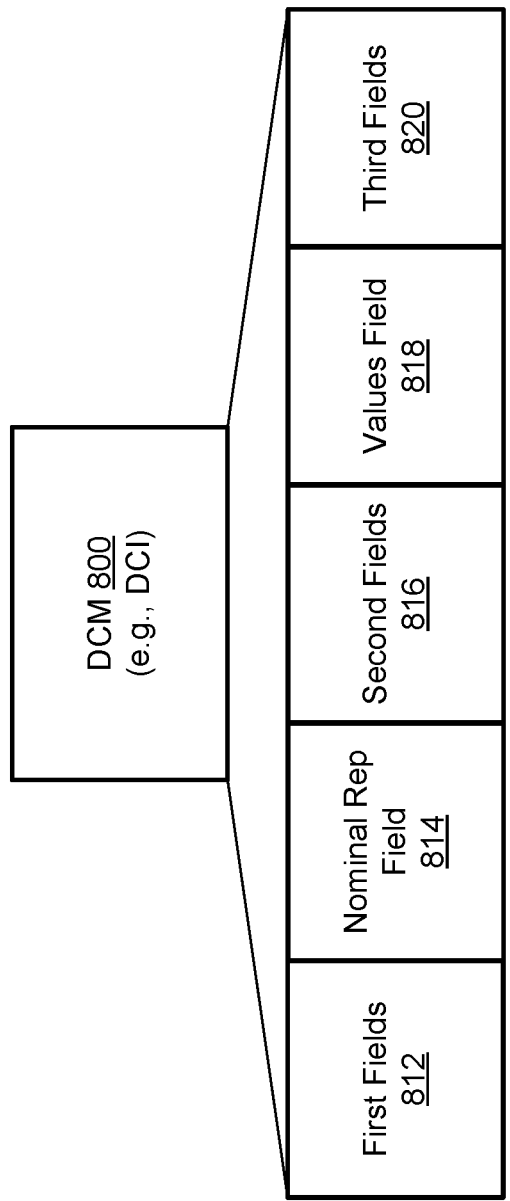
FIGS. 8A and 8B are each a schematic diagram illustrating an example of downlink control message including fields thereof.
Figure 8B:
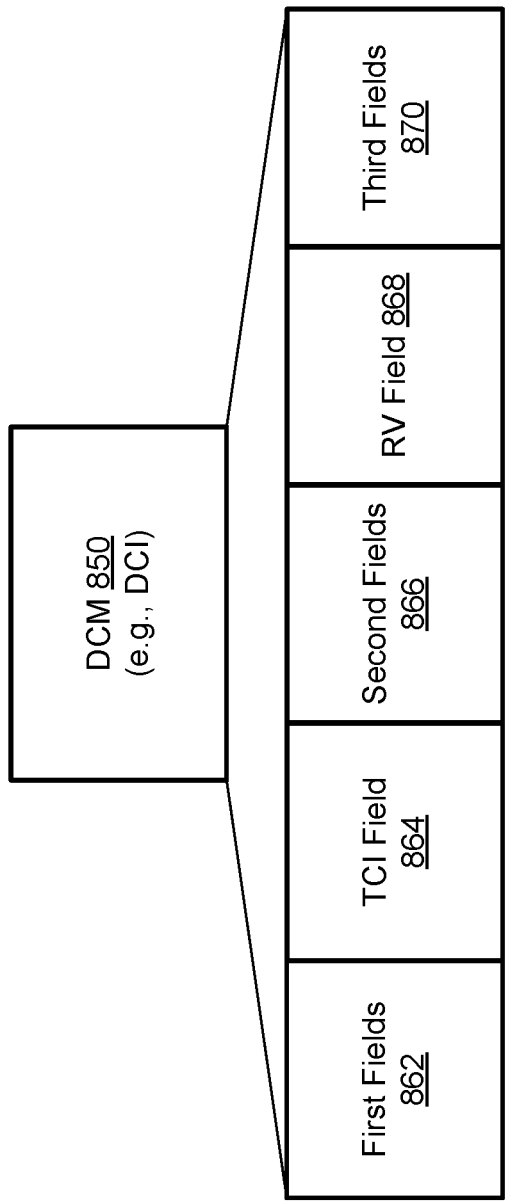

In some implementations, the UE may generate the first sequence based on an amount of nominal repetitions indicated in a downlink control message (e.g., a DCI signal or message), as described further with reference to FIGS. 8A and 8B. The UE may then determine an amount of actual repetitions based on slot configuration data (e.g., slot format indicator (SFI) data) and the amount of nominal repetitions indicated. The UE may the generate the second sequence based on the first sequence and the determined amount of actual repetitions.

A second signaling scheme includes or corresponds to a scheme in which a TCI state value (or SRI value) and/or an RV value for at least one actual repetition of a split nominal repetition is based on a mapping. Said another way, at least one of the two actual repetitions that correspond to the same nominal repetition which was split have a different TCI state/SRI value and/or a different RV value. As illustrated in example 644, a mapping is used to replace the value for a split nominal repetition in the first sequence with two values to generate the second sequence. In the example shown in FIG. 6A, a partial mapping for the TCI state (or SRI) indicates that for a value of 2, the value of 2 is replaced with (2,0). Alternatively, the mapping may provide a single value to insert (e.g., a value of 2 indicates to insert a value of 0 after the value of 2 or before it). For RV, a mapping indicates that for a value of 3, the value of 3 is replaced with (3,2). Alternatively, the mapping may provide a single value to insert (e.g., a value of 3 indicates to insert a value of 2 after or before the value of 3). The mappings for TCI state (or SRI) and RV may be the same or different.

A third signaling scheme includes or corresponds to a scheme in which TCI state values (or SRI values) and/or RV values are determined based on a pattern (e.g., a cyclic pattern). In such third schemes, the values can correspond directly to the pattern, and may be independent of a first sequence of values for the nominal repetitions described with reference to examples 642 and 644. Accordingly, a UE may not receive TCI state/SRI values and/or RV values for nominal repetitions or may generate the sequence for the actual repetitions independent of the TCI state/SRI values and/or RV values for the nominal repetitions.

As illustrated in example 646, a cyclic pattern is given for each of the TCI state/SRI and the RV, and the values for each of the TCI state/SRI and the RV correspond to the values of the cyclic pattern. For example, for a cyclic repeating pattern of 0, 1, 2, 3, 0, 1, 2, 3, etc., the first repetition is always 0, the second repetition is always 1, the third repetition is always 2, the fourth repetition is always 3, the fifth repetition is always 0 and so on for TCI state (or SRI). As another example, for a cyclic repeating pattern of 0, 2, 3, 1, 0, 2, 3, 1, etc., the first repetition is always 0, the second repetition is always 2, the third repetition is always 3, the fourth repetition is always 1, the fifth repetition is always 0 and so on for RV. Although the patterns for TCI state (or SRI) and RV are illustrated as being different, in other implementations the patterns may be the same. Additionally, SRI may have its own pattern different from TCI state, which may or may not be unique from the pattern for RV. Alternatively, the pattern can be reset for each instance of a repetition split, as described further with reference to FIG. 6C, or modified for each instance of a repetition split as described with reference to examples 642 or 644.

In some implementations, the TCI state/SRI value and the RV value can have a joint pattern, i.e., have a pattern jointly. As illustrated in example 648 of a fourth signaling scheme, each of the TCI state/SRI value and the RV value have their own corresponding pattern similar to example 646. In example 648, TCI state/SRI has a pattern of (0,1) and RV has a pattern of (0,3). Additionally, the two patterns may be used together to form a joint pattern. The joint pattern may be separate or interleaved as illustrated in FIG. 6A.

For the example illustrated in FIG. 6A, the separate joint pattern for the TCI state is [0, 1, 0, 1] and the separate joint pattern for the RV is [0, 0, 3, 3]. In the joint pattern, both TCI state values are varied first for each RV value, before the RV value is changed. Thus, the joint pattern for RV has the first pattern value (0,0) twice followed by the second pattern value twice (3,3) The interleaved joint pattern may include the format (TCI state, RV) and have value pairs of: [(0,0), (1,0), (0,3), (1,3)] rather than two separate patterns of (0,1) for TCI state (or SRI) and (0,3) for RV.

Additionally, an illustration of a sequence for separate patterns is also illustrated for clarity and to distinguish the sequences for joint patterns and separate patterns. The separate patterns varies both value TCI state and RV each time (0,1) and (0,3). One or more of the above described patterns may be indicated in the DCI (i.e., a DCI that also indicates an amount of nominal repetitions), in a separate DCI (i.e., a DCI that does not indicate an amount of nominal repetitions, such as previous DCI), or in an RRC message (i.e., be RRC configured).

In other implementations, one or more of schemes 642-646 may be combined. For example, one scheme can be utilized for TCI state/SRI while another scheme is utilized for RV. To illustrate, scheme three (pattern coding) can be used for RV and scheme one can be used for TCI state and/or SRI. Such an illustrative example may provide higher coding gain using scheme three for RV and less complexity and overhead using scheme one for TCI state (or SRI). As other examples, different schemes can be used for TCI state and SRI or different schemes can be used for all three, i.e., TCI state, SRI, and RV.

Referring to FIG. 6B, a first alternative repetition slot format is depicted that includes two repetitions and no splits across a slot boundary. The repetition slot format may include number of repetitions and repetition length. The aspects described herein while enabling a repetition to be split across a slot split or a slot boundary can also be used without repetitions being split and/or can be used to indicate multiple (different) TCI states/SRI and/or RVs for one or more of the repetitions. Accordingly, such aspects may enable multiple TRP operation and/or eURLLC communications.

Referring to FIG. 6C, a second alternative repetition slot format is depicted that includes a single repetition which is split across a slot boundary. In FIG. 6C, the single repetition is 14 symbols in length and each slot 602, 604 is 10 symbols in length. Accordingly, the single repetition 622 would break across the slot boundary because it is larger/longer than the slot, i.e., includes more symbols than the slot (e.g., a format thereof). In the aspects described herein, the single repetition 622 (referred to as a first nominal repetition) can be split into two corresponding actual repetitions 622A, 622B (e.g., first and second actual repetitions 622A, 622B) and across the slot boundary.

Additionally, other exemplary schemes and indications for signaling the repetitions are described with reference to FIG. 6D. Referring to FIG. 6D, a third alternative repetition slot format is depicted that includes a three repetitions where a third repetition is split across a slot boundary. In FIG. 6D, each repetition is 4 symbols long and each slot 602, 604 is 10 symbols in length. Accordingly, the third repetition 626 would break across the slot boundary. In the aspects described herein, the third repetition 626 (referred to as a third nominal repetition) can be split into two corresponding actual repetitions 626A, 626B (e.g., third and fourth actual repetitions 626A, 626B) and across the slot boundary.

In FIG. 6D, two alternative cyclic pattern schemes are illustrated, example 646A and example 646B. In example 646A, pure cyclic pattern coding is used, i.e., the cyclic pattern does not change based on splitting of a repetition. For example, the cyclic pattern of 0, 1, 2, 3, generates a sequence of 0, 1, 2, 3, even though the third repetition 626 is split into two actual repetitions Referring to example 646B, a modified cyclic pattern is illustrated. In example 646B, the cyclic pattern is modified based on splitting of a repetition. As illustrated in example 646B, the cyclic pattern is modified for the second repetition or the split actual repetition of a corresponding nominal repetition. In other implementations, the cyclic pattern may be modified for the first or actual repetition that occurs before the split or the cyclic pattern may be modified after both of the actual repetitions corresponding to the split nominal repetition. The modification may be insertion of a value, such as in example 642, mapping based, such as in 644, restarting of the cyclic pattern, such as in examples 646B, or may be insertion of another cyclic pattern, as described further with reference to FIG. 7A. A combination of cyclic pattern coding and other schemes (e.g., mapping) is also illustrated further with reference to FIG. 7B.

Figure 7A:
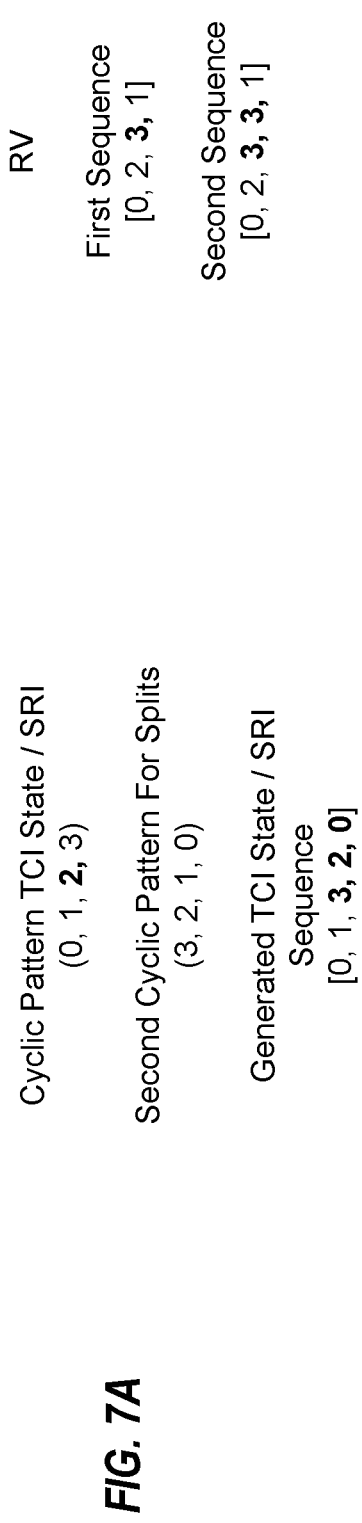
FIGS. 7A and 7B are each a diagram illustrating an example of TCI state or SRI and RV sequence generation.
Figure 7B:
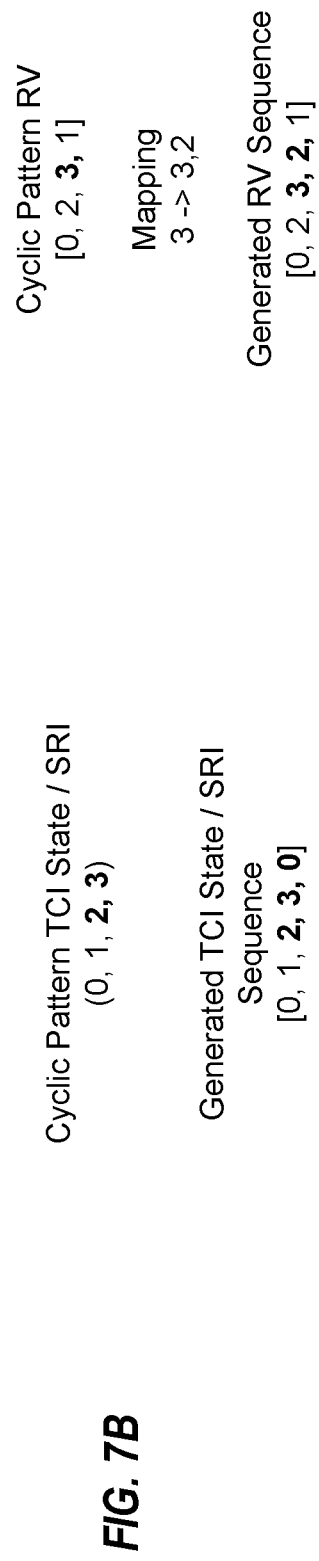

Referring to FIGS. 7A and 7B, additional schemes for signaling the repetitions are described with reference to the repetition slot format of FIG. 6A (i.e., a 4 nominal repetition slot format where the third nominal repetition is split). In FIGS. 7A and 7B, bolding of numbers is used to emphasize differences in number sequences and/or changes to numbers or the sequence (e.g., insertion of a number). In FIG. 7A, the TCI state (or SRI) is signaled using two cyclic patterns and the RV is signaled as described with reference to example 642 of FIG. 6A. As illustrated in FIG. 7A, the TCI state (or SRI) includes a first cyclic pattern for non-split or nominal repetitions and a second cyclic pattern for split or actual repetitions. The two cyclic patterns are used in conjunction with an actual number of repetitions to determine the sequence of the TCI state values. For example, the sequence is generated based on the first cyclic pattern for the first two values as the first two repetitions are not split, i.e., (0,1). The third and fourth values of the sequence are generated based on the second cyclic pattern as the third nominal repetition is split into two actual repetitions (third and fourth actual repetitions), i.e., (3,2). The fifth value of the sequence is generated based on the first cyclic pattern as the fourth nominal repetition (and fifth actual repetition) is not split, i.e., 0. As illustrated in FIG. 7A, the fifth value of the sequence is zero as the first cyclic pattern has reset based on an intervening split repetition. In other implementations, the first cyclic pattern may resume and continue without resetting to the first value. In such circumstances, fifth value of the sequence would be 2 because the third value of the first cyclic pattern is 2 and is next in line after the first two values were used for the first and second nominal (and actual) repetitions.

Referring to FIG. 7B, the TCI state (or SRI) is signaled using a cyclic pattern as described with reference to example 646 of FIG. 6A and the RV is signaled using a cyclic pattern with mapping as mentioned in FIG. 6D. As illustrated in FIG. 7B, the RV includes a cyclic pattern for non-split or nominal repetitions and a mapping for split or actual repetitions. An exemplary mapping for the third value of the cyclic pattern 3 is illustrated in FIG. 7B, i.e., 3 maps to (3,2). Accordingly, the generated RV sequence is (0,2), based on the cyclic pattern, followed by (3,2) based on the mapping corresponding to the third value of the cyclic pattern and for the nominal repetitions that was split into two actual repetitions. The generated RV sequence ends in 1 because the fourth value of the cyclic pattern remains unchanged as the fourth nominal repetition (and fifth actual) is not split. Alternatively, the cyclic pattern could be reset following the insertion of the mapping for a split repetition. In such implementations, the firth value of the generated sequence would be 0, i.e., the starting or first value of the cyclic pattern for RV. Thus, the cyclic pattern with mapping described with reference to FIG. 7B, corresponds to a combination of the mapping of example 644 and the cyclic patterns of examples 646, 646A, 646B, and/or 648.

Although the foregoing implementations disclose that each of the splits are handled in the same manner, in other implementations, different types of splits may utilize different schemes. For example a first particular type of split (intra-slot split) may utilize a first type of scheme and a second particular type of split (inter-slot split, i.e., slot boundary split) may utilize a second type of scheme. To illustrate, the first particular type of split (intra-slot split) may utilize the scheme of example 642 (insertion) and the second particular type of split (inter-slot split, i.e., slot boundary split) may utilize the scheme of example 644 (mapping).

Referring to FIGS. 8A and 8B, examples of field layouts for downlink control messages are illustrated. In FIG. 8A, an example field layout of a downlink control message 800 is illustrated. The downlink control message 800 may include or correspond to the downlink control message 520 FIG. 5A. The downlink control message 850 includes one or more fields. As illustrated in FIG. 8A, the downlink control message 800 is a DCI. A DCI (or DCI message) may have multiple different types or formats, such as Format 0_0, 0_1, 1_0, 1_1, etc. In the example illustrated in FIG. 8A, the downlink control message 800 includes one or more first fields 812, a nominal repetition field 814, one or more second fields 816, a values field 818, and one or more third fields 820. The one or more fields 812, 816, and 820 may be optional.

The nominal repetition field 814 identifies or indicates an amount (e.g., number) of nominal PDSCH repetitions, an amount (e.g., number) of nominal PUSCH repetitions, or both. The nominal repetition field 814 may include or correspond to TDRA field. In a particular implementation, the nominal repetition field 814 is a 4 bit field and may be capable of indicating a reserved value.

The nominal repetition field 814 may indicate the amount of repetitions directly. For example, a value of the nominal repetition field 814, i.e., a value identified by bits thereof, is or indicates the amount (e.g., number) of nominal PDSCH repetitions (or the amount (e.g., number) of nominal PUSCH repetitions). To illustrate, a bit sequence of 11 illustrates 4 repetitions when the nominal repetition field 814 is not configured to indicate a reserved value.

The nominal repetition field 814 may indicate the amount of repetitions indirectly, i.e., identify the amount of repetitions by indicating a member of set. For example, a value of the nominal repetition field 814, i.e., a value identified by bits thereof, indicates a particular member of a set of repetition values, and a value (e.g., a second value) of the particular member indicates the amount of repetitions. To illustrate, a bit sequence of 111 illustrates an 8th member of a set.

The value field 818 indicates a value for TCI state, a value for SRI, a value for RV, or a combination thereof, for each nominal repetition (e.g., PDSCH repetition or PUSCH repetition). For example, the value field 818 indicates values for TCI state and RV for nominal PDSCH repetitions or indicates values for SRI and RV for PUSCH repetitions. In a particular implementation, the value field 818 is a multi-bit field. In the implementations described herein, the values (or a sequence thereof) of the value field 818 for the nominal repetitions can be repurposed to identify values for actual repetitions. Although the nominal repetition field 814 is illustrated as being separate from the value field 818, the fields 814 and 868 may be contiguous fields. Additionally or alternatively, one or more of fields 864 or 868 may be a first field or a last field.

In some implementations, the value field 818 indirectly indicates the amount of repetitions. For example, the UE may determine that 4 nominal repetitions are indicated when the value field includes or indicates 4 TCI state values. Accordingly, in some implementations, the nominal repetition field 814 may be omitted. In other implementations, the value field 818 indicates a pattern, such as a cyclic pattern. In such implementations, the UE determines the values for the repetitions based on the number of actual repetitions, which may be determined based on the number of nominal as described above, and the cyclic pattern. Additionally, the UE may determine the values for the repetitions independent of values for the nominal repetitions (e.g., a first sequence of values for nominal repetitions).

Referring to FIG. 8B, an example field layout of a downlink control message 850 is illustrated. In the example illustrated in FIG. 8B, the downlink control message 850 includes one or more first fields 862, a TCI state field 864 (also referred to herein as a TCI field), one or more second fields 866, an RV field 868, and one or more third fields 870. The one or more fields 862, 866, and 870 may be optional.

The TCI state field 864 identifies or indicates a value for TCI state for one or more nominal repetitions (e.g., PDSCH repetitions). For example, the TCI state field 864 indicates values for TCI state for each nominal PDSCH repetition or indicates values for TCI state for each PUSCH repetition. In a particular implementation, the TCI state field 864 is a 2 bit field. In the implementations described herein, the values (or a sequence thereof) of the TCI state field 864 for the nominal repetitions can be repurposed to identify values for actual repetitions.

The TCI state field 864 may indicate the values for the TCI states directly. For example, a value of the TCI state field 864, i.e., a value identified by bits thereof, is or indicates the value for one or more of the TCI states of the actual repetitions. To illustrate, a bit of the TCI state field 864 corresponds to a TCI state value for a particular nominal repetition. Additionally, or alternatively, the TCI state field 864 or (or another field, such as 862, 866, or 870) may indicate the values for UL TCI states. To illustrate, the UL TCI fields indicates two or more TCI states for UL/PUSCH repetitions.

The TCI state field 864 may indicate the amount of repetitions indirectly, i.e., identify the amount of repetitions by indicating a member of set. For example, a value of the TCI state field 864, i.e., a value identified by bits thereof, indicates a particular member of a set of TCI state values, and a value (e.g., a second value) of the particular member indicates the TCI state value. To illustrate, a bit sequence of 111 illustrates an 8$^{th}$ member of a set. Additionally, or alternatively, the downlink control message 850 includes a SRI field, similar to the TCI field 864, which identifies or indicates a value for SRI for one or more nominal repetitions (e.g., PUSCH repetitions).

The RV field 868 indicates a value for RV for one or more nominal repetitions (e.g., PDSCH repetitions or PUSCH repetitions). For example, the RV field 868 indicates values for RV for each nominal PDSCH repetition or indicates values for RV for each PUSCH repetition. In a particular implementation, the RV field 868 is a 2 bit field. In the implementations described herein, the values (or a sequence thereof) of the RV field 868 for the nominal repetitions can be repurposed to identify values for actual repetitions. Although the TCI state field 864 is illustrated as being separate from the RV field 868, the fields 864 and 868 may be contiguous fields. Additionally or alternatively, one or more of fields 864 or 868 may be a first field or a last field.

In some implementations, the RV field 868 indirectly indicates the amount of repetitions. For example, the UE may determine that 4 nominal repetitions are indicated when the RV field 868 includes or indicates 4 RV values. Accordingly, in some implementations, the nominal repetitions field 864 may be omitted. In other implementations, the RV field 868 indicates a pattern, such as a cyclic pattern. In such implementations, the UE determines the values for the repetitions based on the number of actual repetitions, which may be determined based on the nominal repetitions field 864, or a determined number of nominal repetitions as described above, and the cyclic pattern. Additionally, the UE may determine the values for the repetitions independent of values for the nominal repetitions (e.g., a first sequence of values for nominal repetitions).

Figure 11:
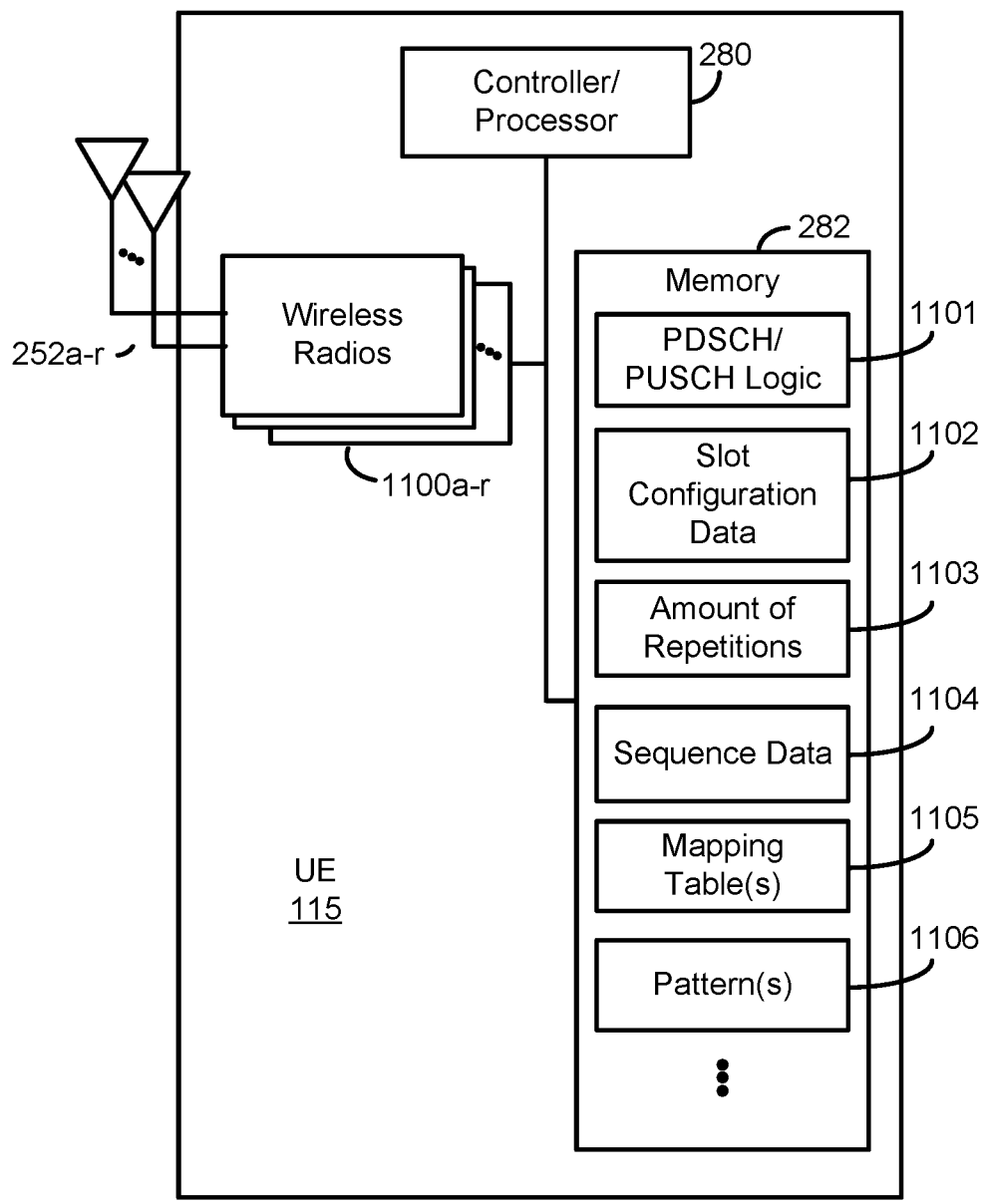
FIG. 11 is a block diagram conceptually illustrating a design of a UE according to some embodiments of the present disclosure.
Figure 12:
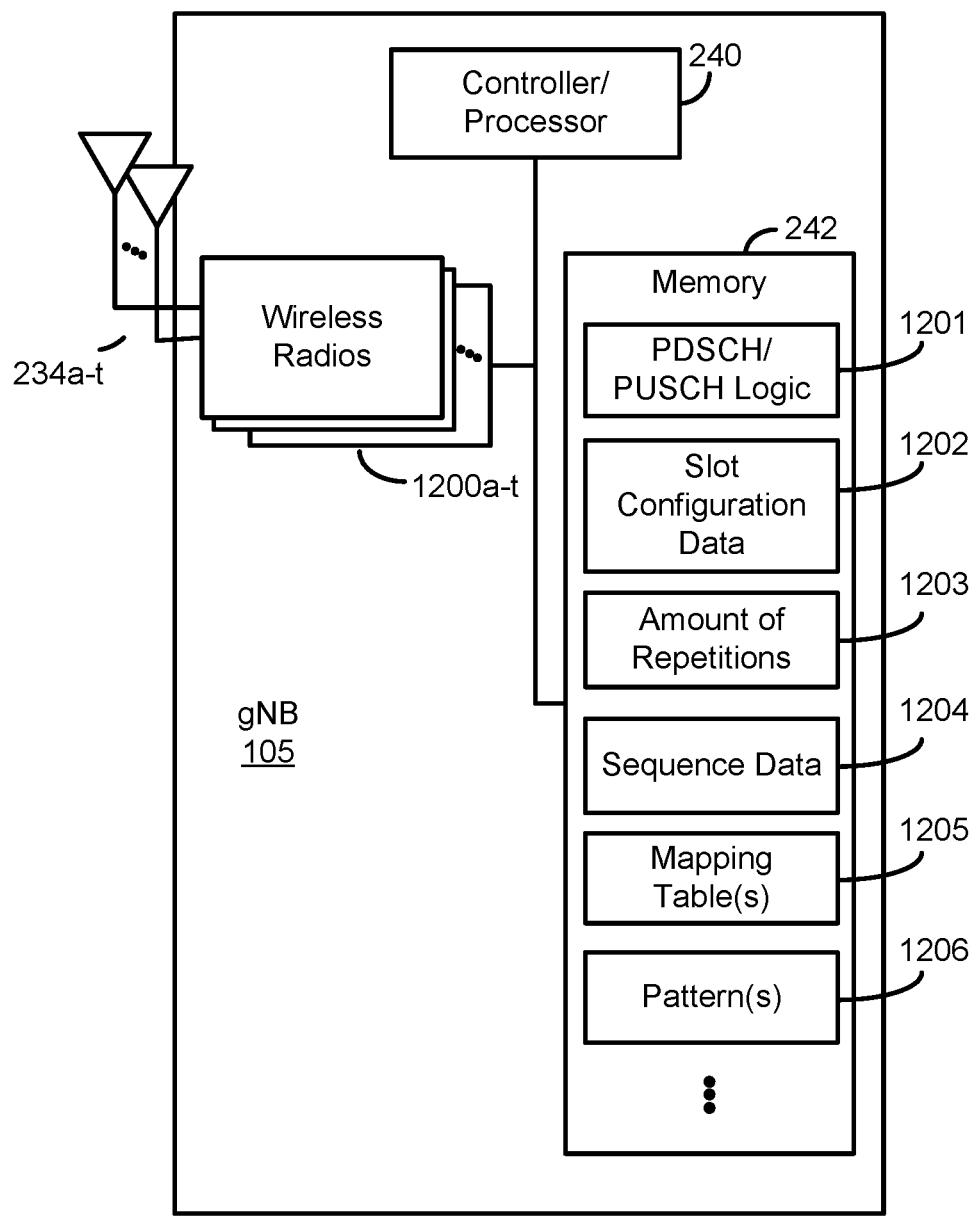
FIG. 12 is a block diagram conceptually illustrating a design of a base station configured according to some embodiments of the present disclosure.

FIG. 9 is a block diagram illustrating example blocks executed by a UE configured according to an aspect of the present disclosure. The example blocks will also be described with respect to UE 115 as illustrated in FIG. 11. FIG. 11 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1100a-r and antennas 252a-r. Wireless radios 1100a-r includes various components and hardware, as illustrated in FIG. 2 for UE 115, including modulator/demodulators 254a-r, MIMO detector 256, receive processor 258, transmit processor 264, and TX MIMO processor 266. UE 115 may receive signals from and/or transmit signal to a base station or TRP, such as base station 105 as illustrated in FIG. 12. The base station 105 of FIG. 12 includes similar components to UE 115 of FIG. 11. For example, the base station 105 include corresponding components 1201-1206 which correspond to components 1101-1106 of the UE 115.

At block 900, a UE receives a downlink control information (DCI) including a field indicating a quantity of nominal Physical Downlink Shared Channel (PDSCH) repetitions over two or more Transmission Configuration Indicator (TCI) states. A UE, such as UE 115, may execute, under control of controller/processor 280, PDSCH/PUSCH repetition logic 1101 (e.g., eURLLC logic and/or multiple TRP logic), stored in memory 282. The execution environment of PDSCH/PUSCH repetition logic 1101 provides the functionality for UE 115 to define and perform the PDSCH/PUSCH repetition procedures. The execution environment of PDSCH/PUSCH repetition logic 1101 defines the different PDSCH/PUSCH repetition processes, receives control information from a serving base station related to the PDSCH/PUSCH repetition processes, such as in receiving and decoding the relevant information from the downlink control message (e.g., DCI), such as DCM 520, 800, or 850. As UE 115 receives the downlink control message via antennas 252a-r and wireless radios 1100a-r, UE 115 identifies the fields (e.g., nominal repetition field 814, values field 818, TCI state field 864 (or SRI field (e.g., 864)), RV field 868, or a combination thereof) contained therein and the corresponding values of the fields.

UE 115 may then determine the quantity of nominal PDSCH repetitions directly or indirectly. For example UE 115 may determine the quantity of nominal PDSCH repetitions 1103 directly and as indicated by a particular field, such as the nominal repetition field 814. Alternatively, UE 115 determines the quantity of nominal PDSCH repetitions indirectly based on a number of TCI state values or RV values indicated by the TCI state field 864 or RV field 868. For example, the UE 115 may use the TCI state field 864, RV field 868, or a combination thereof, to determine the number of TCI state values or RV values.

At block 901, the UE determines a quantity of actual PDSCH repetitions based on the quantity of nominal PDSCH repetitions and slot configuration data. The execution environment of PDSCH/PUSCH repetition logic 1101 provides UE 115 the functionalities described with respect to the various aspects of the present disclosure. UE 115 obtains the quantity of the actual PDSCH repetitions, 1103. Within the execution environment of PDSCH/PUSCH repetition logic 1101, UE 115, under control of controller/processor 280, parses the DCI to identify values of the fields. Parsing or processing the DCI may obtain or determine the quantity of nominal PDSCH repetitions indicated by the DCI. UE 115 then determines the quantity of actual PDSCH repetitions based on the determined or indicated quantity of the nominal PDSCH repetitions and slot configuration data 1102. The slot configuration data 1102 may include or correspond to slot length, slot boundary locations, slot symbol arrangement (e.g., slot format indicator (SFI)), or a combination thereof. As an illustrative, example, UE 115 determines a number of repetitions which overlap a slot split or a slot boundary based on the slot configuration data and the UE 115 increments the number of nominal repetitions by the number of repetitions which are to be split. In addition, UE 115 may determine the quantity of actual PDSCH repetitions further based on PDSCH repetition settings, such as PDSCH repetition symbol length.

At block 902, the UE determines a TCI state and a redundancy version (RV) for each PDSCH repetition of the actual PDSCH repetitions based on at least the quantity of the actual PDSCH repetitions. Once UE 115 determines the quantity of actual PDSCH repetitions at block 901, UE 115 may determine the sequence data 1104 which includes or indicates a TCI state and a RV for each PDSCH repetition of the actual PDSCH repetitions. For example, UE 115 determines the sequence data 1104 based on one or more patterns 1106, such as one or more cyclic patterns described with reference to FIGS. 6A-6D, 7A, and 7B. As another example, UE 115 determines a first sequence of TCI state and RV values for the nominal repetitions of the sequence data 1104 based on one or more fields of the DCI, such as the TCI state field 864, the RV field 868, or both, and generates a second sequence based on the first sequence. UE 115 may generate the second sequence of the sequence data 1104 based on the sequence data 1104 (e.g., insert same value), one or more mapping table(s) 1105, one or more patterns 1106, or a combination thereof, as described with reference to FIGS. 6A-6D, 7A, and 7B. The one or more mapping table(s) 1105 may include or correspond to one or more a lookup tables. The lookup tables may be based on inputs of an original value for a corresponding nominal PDSCH/PUSCH repetition for the particular actual PDSCH/PUSCH repetition, an original value of other nominal PDSCH/PUSCH repetitions, the quantity of nominal PDSCH/PUSCH repetitions, the quantity of actual PDSCH/PUSCH repetitions, or a combination thereof.

At block 903, the UE receives PDSCH repetitions transmissions based on the TCI state and the RV for the actual PDSCH repetitions. Once UE 115 the TCI state and the RV for each PDSCH repetition of the actual PDSCH repetitions at block 902, UE 115 may receive the PDSCH repetitions transmissions for the PDSCH repetitions processes via wireless radios 1100*a-r* and antennas 252*a-r*. UE 115 may process the received PDSCH repetitions transmissions for the PDSCH repetitions processes using controller/processor 280.

FIG. 10 is a block diagram illustrating example blocks executed by a UE configured according to an aspect of the present disclosure. The example blocks will also be described with respect to UE 115 as illustrated in FIG. 11. FIG. 11 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1100*a-r* and antennas 252*a-r*. Wireless radios 1100*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 1000, a UE receives a downlink control message including a first field indicating a quantity of nominal Physical Uplink Shared Channel (PUSCH) repetitions and a second field indicating two or more sets of transmission parameters to be used for PUSCH repetitions. A UE, such as UE 115, may execute, under control of controller/processor 280, PDSCH/PUSCH repetition logic 1101, stored in memory 282. The execution environment of PDSCH/PUSCH repetition logic 1101 provides the functionality for UE 115 to define and perform the PUSCH repetition procedures. The execution environment of PDSCH/PUSCH repetition logic 1101 defines the different PUSCH repetition processes, receives control information from a serving base station related to the PUSCH repetition processes, such as in receiving and decoding the relevant information from the downlink control message (e.g., DCI). As UE 115 receives the downlink control message via antennas 252*a-r* and wireless radios 1100*a-r*, UE 115 identifies at least the first and second fields (e.g., nominal repetition field 814, values field 818, TCI state/SRI field 864, RV field 868, or a combination thereof) contained therein and the corresponding values of the fields.

In a particular example, the first field includes or corresponds to a transmission parameters field, such as SRI (e.g., 864), and the second field includes or corresponds to a resource value field, such as RV field 868. For example, the second field may indicate or includes two or more SRIs. Each SRI indicates one or more transmission parameters, such as precoding parameters, UL beam parameters, transmit power control parameters, etc., by referring to one or more SRS resources as a reference signal for determining those transmission parameters. In other implementations, the second field may be a "UL TCI" field or another type of new or proposed field. In such UL TCI field implementations, the UL TCI fields indicates two TCI states for UL/PUSCH similar to DL TCI operations described above.

At block 1001, the UE determines a quantity of actual PUSCH repetitions based on the quantity of nominal PUSCH repetitions and slot configuration data. The execution environment of PDSCH/PUSCH repetition logic 1101 provides UE 115 the functionalities described with respect to the various aspects of the present disclosure. UE 115 obtains the quantity of the actual PUSCH repetitions, 1103. Within the execution environment of PDSCH/PUSCH repetition logic 1101, UE 115, under control of controller/processor 280, parses the DCI to identify values of the fields. Parsing or processing the DCI may obtain or determine the quantity of nominal PUSCH repetitions indicated by the DCI. UE 115 then determines the quantity of actual PUSCH repetitions based on the determined or indicated quantity of the nominal PUSCH repetitions and slot configuration data 1102. The slot configuration data 1102 may include or correspond to slot length, slot boundary locations, slot symbol arrangement (e.g., slot format indicator (SFI)), or a combination thereof. As an illustrative, example, UE 115 determines a number of repetitions which overlap a slot split or a slot boundary based on the slot configuration data and the UE 115 increments the number of nominal PUSCH repetitions by the number of PUSCH repetitions which are to be split. In addition, UE 115 may determine the quantity of actual PUSCH repetitions further based on PUSCH repetition settings, such as PUSCH repetition symbol length.

At block 1002, the UE determines a set of transmission parameters and a redundancy version (RV) for each PUSCH repetition of the actual PUSCH repetitions based on at least the quantity of the actual PUSCH repetitions. Once UE 115 determines the quantity of actual PUSCH repetitions at block 1001, UE 115 may determine the sequence data 1104 which includes or indicates a SRI value and a RV value for each PUSCH repetition of the actual PUSCH repetitions. For example, UE 115 determines the sequence data 1104 based on one or more patterns 1106, such as one or more cyclic patterns described with reference to FIGS. 6A-6D, 7A, and 7B. As another example, UE 115 determines a first sequence of SRI and RV values for nominal repetitions of the sequence data 1104 based on one or more fields of the DCI, such as the SRI field (e.g., 864), the RV field 868, or both, and generates a second sequence based on the first sequence. UE 115 may generate the second sequence of the sequence data 1104 based on the sequence data 1104 (e.g., insert same value), one or more mapping table(s) 1105, one or more patterns 1106, or a combination thereof, as described with reference to FIGS. 6A-6D, 7A, and 7B.

The sequence data 1104 may be generated based on RRC configuration(s) as well. For example, RRC messages can configure an RV sequence and a DCI can indicate the starting RV of the sequence. To illustrate, an RRC message can configure an SRI/beam pattern (e.g. one of {beam1, beam1, beam2, beam2} corresponding to a sequential pattern or {beam1, beam2, beam1, beam2} corresponding to cyclic pattern, and a DCI indicates which beams (e.g. beam1 and beam2) of the sequence. The DCI may use the SRI field to indicate such beams or other parameters.

At block 1003, the UE transmits the PUSCH repetitions based on the set of transmission parameters and the RV for the actual PUSCH repetitions. Once UE 115 determines the SRI and the RV for each PUSCH repetition of the actual PUSCH repetitions at block 1002, UE 115 may transmit the PUSCH repetitions for the PUSCH repetition processes via wireless radios 1100a-r and antennas 252a-r. UE 115 may generate the transmitted PUSCH repetition transmissions for the PUSCH repetitions processes using controller/processor 280.

In a first aspect, the second field includes two or more Sounding Reference Signal (SRS) Resource Indicators (SRIs) which indicate the two or more sets of transmission parameters In a second aspect, alone or in combination with one or more of the above aspects, the UE 115 determines an original SRI and RV for each of the nominal PUSCH repetitions based on RRC configurations, the downlink control message, or both, to generate a first sequence of SRIs and RVs for the nominal PUSCH repetitions. The UE 115 also modifies the first sequence of the SRIs and the RVs for the nominal PUSCH repetitions based on the quantity of the actual PUSCH repetitions to generate a second sequence of SRIs and RVs for the actual PUSCH repetitions.

In a third aspect, alone or in combination with one or more of the above aspects, modifying the first sequence of the SRIs and the RVs for the nominal PUSCH repetitions includes inserting a particular SRI, a particular RV, or both, into the first sequence corresponding to a particular actual PUSCH repetition occurring after a slot boundary or after one or more invalid symbols of a nominal repetition to generate the second sequence of SRIs and RVs for the actual PUSCH repetitions.

In a fourth aspect, alone or in combination with one or more of the above aspects, the UE 115 refrains from modifying one or more original SRIs and RVs of the first sequence of the SRIs and the RVs for the nominal PUSCH repetitions to generate the second sequence of SRIs and RVs for the actual PUSCH repetitions.

In a fifth aspect, alone or in combination with one or more of the above aspects, the particular SRI, the particular RV, or both, for the particular actual PUSCH repetition occurring after the slot boundary or after the one or more invalid symbols of the nominal repetition have the same value as a corresponding SRI, RV, or both, for a corresponding PUSCH repetition occurring before the slot boundary or before the one or more invalid symbols of the nominal repetition.

In a sixth aspect, alone or in combination with one or more of the above aspects, the particular SRI, the particular RV, or both, have a different value for the particular actual PUSCH repetition occurring after the slot boundary or after the one or more invalid symbols of the nominal repetition from a value of a corresponding SRI, RV, or both, for a corresponding PUSCH repetition occurring before the slot boundary or before the one or more invalid symbols of the nominal repetition.

In a seventh aspect, alone or in combination with one or more of the above aspects, the particular SRI, the particular RV, or both, inserted into the first sequence of the SRIs and the RVs for the nominal PUSCH repetition are determined based on a mapping or a formula.

In an eighth aspect, alone or in combination with one or more of the above aspects, the different value of the particular SRI, the particular RV, or both, for the particular actual PUSCH repetition occurring after the slot boundary or after the one or more invalid symbols of the nominal repetition is determined based on the formula. In some such aspects the formula includes an input for an original value of the particular SRI, the particular RV, or both, for a nominal PUSCH repetition which corresponds to the particular actual PUSCH repetition, for an original value of the particular SRI, the particular RV, or both, for other nominal PUSCH repetitions, for the quantity of nominal PUSCH repetitions, for the quantity of actual PUSCH repetitions, or a combination thereof.

In a ninth aspect, alone or in combination with one or more of the above aspects, prior to receiving the downlink control message, the UE 115 receives a radio resource control (RRC) message indicating the mapping. The mapping corresponds to a table and is based on inputs of an original value for a corresponding nominal PUSCH repetition for the particular actual PUSCH repetition, an original value of other nominal PUSCH repetitions, the quantity of nominal PUSCH repetitions, the quantity of actual PUSCH repetitions, or a combination thereof.

In a tenth aspect, alone or in combination with one or more of the above aspects, the second field includes two or more Sounding Reference Signal (SRS) Resource Indicators (SRIs) which indicate the two or more sets of transmission parameters, and determining the SRIs and the RVs for the actual PUSCH repetitions includes determining, by the UE, a sequence of the SRIs and the RVs for the actual PUSCH repetitions based on the quantity of the actual PUSCH repetitions and a cyclic pattern.

In an eleventh aspect, alone or in combination with one or more of the above aspects, the SRIs, the RVs, or both individually, have the cyclic pattern, or pairs of corresponding SRI and RV values have the cyclic pattern jointly.

In a twelfth aspect, alone or in combination with one or more of the above aspects, the cyclic pattern is received in the downlink control message, the downlink control message comprising Downlink Control Information (DCI), or the cyclic pattern is received in radio resource control (RRC) message and stored at the UE prior to receiving the downlink control message.

In a thirteenth aspect, alone or in combination with one or more of the above aspects, the sets of transmission parameters are determined based on a first scheme, and the RVs are determined based on a second scheme that is different from the first scheme.

In a fourteenth aspect, alone or in combination with one or more of the above aspects, the sets of transmission parameters are determined based on modifying a sequence of Sounding Reference Signal (SRS) Resource Indicators (SRIs) for the nominal PUSCH repetitions, and the RVs are determined based on a cyclic pattern.

In a fifteenth aspect, alone or in combination with one or more of the above aspects, the slot configuration data includes uplink downlink symbol data, slot length, or a combination thereof, where one or more invalid symbols of a nominal repetition correspond to a transition between an uplink symbol and a downlink symbol in the slot.

In some such aspects, the UE 115 receives an RRC message indicating one or more patterns of invalid symbols, and receives a DCI message indicating a particular pattern of invalid symbols of the one or more patterns of invalid symbols. The UE also determines one or more invalid symbols of the nominal PUSCH repetitions based on the particular pattern of invalid symbols, and uplink downlink switches based on the uplink downlink symbol data. The UE 115 further determines slot boundaries based on slot length data and determines the quantity of actual PUSCH repetitions based on the quantity of nominal PUSCH repetitions, the one or more invalid symbols, the uplink downlink switches, and the slot boundaries. The UE also generates the PUSCH repetition transmissions based on the set of transmission parameters and the RV for the actual PUSCH repetitions.

In a sixteenth aspect, alone or in combination with one or more of the above aspects, the UE 115 receives a second downlink control message including a field indicating a quantity of nominal Physical Downlink Shared Channel (PDSCH) repetitions over two or more Transmission Configuration Indicator (TCI) states and determines a quantity of actual PDSCH repetitions based on the quantity of nominal PDSCH repetitions and slot configuration data. The UE 115 also determines a TCI state and a redundancy version (RV) for each PDSCH repetition of the actual PDSCH repetitions based on at least the quantity of the actual PDSCH repetitions and receives PDSCH repetitions transmissions based on the TCI state and the RV for the actual PDSCH repetitions.

In a seventeenth aspect, alone or in combination with one or more of the above aspects, modifying the first sequence of the SRIs and the RVs for the nominal PUSCH repetitions includes inserting a particular SRI, a particular RV, or both, into the first sequence corresponding to a particular actual PUSCH repetition occurring after a slot boundary or after one or more invalid symbols of a nominal repetition to generate the second sequence of SRIs and RVs for the actual PUSCH repetitions. In some such aspects, the UE 115 refrains from modifying one or more original SRIs and RVs of the first sequence of the SRIs and the RVs for the nominal PUSCH repetitions to generate the second sequence of SRIs and RVs for the actual PUSCH repetitions.

In an eighteenth aspect, alone or in combination with one or more of the above aspects, the slot configuration data includes uplink downlink symbol data, slot length, or a combination thereof, where one or more invalid symbols of a nominal repetition corresponds to a transition between an uplink symbol and a downlink symbol in the slot. In some such aspects, the UE 115 determines uplink downlink switches based on the uplink downlink symbol data; and determines slot boundaries based on slot length data and determines the quantity of actual PUSCH repetitions based on the quantity of nominal PUSCH repetitions, the uplink downlink switches, and the slot boundaries. The UE 115 also generates the PUSCH repetition transmissions based on the SRI and the RV for the actual PUSCH repetitions.

In a nineteenth aspect, alone or in combination with one or more of the above aspects, modifying the first sequence of the SRIs and the RVs for the nominal PUSCH repetitions includes inserting a particular SRI, a particular RV, or both, into the first sequence corresponding to a particular actual PUSCH repetition occurring after a slot boundary or after one or more invalid symbols of a nominal repetition to generate the second sequence of SRIs and RVs for the actual PUSCH repetitions.

In a twentieth aspect, alone or in combination with one or more of the above aspects, the second field includes two or more Sounding Reference Signal (SRS) Resource Indicators (SRIs) which indicate the two or more sets of transmission parameters, and the UE 115 determining the SRIs and the RVs for the actual PUSCH repetitions includes the UE determining a sequence of the SRIs and the RVs for the actual PUSCH repetitions based on the quantity of the actual PUSCH repetitions and a cyclic pattern.

In a twenty-first aspect, alone or in combination with one or more of the above aspects, the slot configuration data includes uplink downlink symbol data, slot length, or a combination thereof, where one or more invalid symbols of a nominal repetition corresponds to a transition between an uplink symbol and a downlink symbol in the slot. In some such aspects, the UE 115 determines uplink downlink switches based on the uplink downlink symbol data and determines slot boundaries based on slot length data. The UE 115 also determines the quantity of actual PUSCH repetitions based on the quantity of nominal PUSCH repetitions, the uplink downlink switches, and the slot boundaries, and generates the PUSCH repetition transmissions based on the set of transmission parameters and the RV for the actual PUSCH repetitions.

In a twenty-second aspect, alone or in combination with one or more of the above aspects, the second field includes two or more Sounding Reference Signal (SRS) Resource Indicators (SRIs). In some such aspects, the UE 115 determines an original SRI and RV for each of the nominal PUSCH repetitions based on RRC configurations, the downlink control message, or both, to generate a first sequence of SRIs and RVs for the nominal PUSCH repetitions, and to modify the first sequence of the SRIs and the RVs for the nominal PUSCH repetitions based on the quantity of the actual PUSCH repetitions to generate a second sequence of SRIs and RVs for the actual PUSCH repetitions.

In a twenty-third aspect, alone or in combination with one or more of the above aspects, the set of transmission parameters includes one or more Sounding Reference Signal (SRS) Resource Indicators (SRIs), and determining the SRIs and the RVs for the actual PUSCH repetitions includes the UE determining a sequence of the SRIs and the RVs for the actual PUSCH repetitions based on the quantity of the actual PUSCH repetitions and a cyclic pattern.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps (e.g., the logical blocks in FIGS. 9 and 10) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a web site, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
   receiving, by a user equipment (UE), a downlink control message including a first field indicating a quantity of nominal Physical Uplink Shared Channel (PUSCH) repetitions and a second field indicating two or more sets of transmission parameters to be used for transmission of PUSCH repetitions;
   determining, by the UE, a quantity of actual PUSCH repetitions based on the quantity of nominal PUSCH repetitions and slot configuration data;
   determining, by the UE, a set of transmission parameters and a redundancy version (RV) for each PUSCH repetition of the actual PUSCH repetitions based on at least the quantity of the actual PUSCH repetitions; and
   transmitting, by the UE, the PUSCH repetitions transmissions based on the set of transmission parameters and the RV for the actual PUSCH repetitions.

2. The method of claim 1, wherein the second field includes two or more Sounding Reference Signal (SRS) Resource Indicators (SRIs) which indicate the two or more sets of transmission parameters, and further comprising:
   determining, by the UE, an original SRI and RV for each of the nominal PUSCH repetitions based on RRC configurations, the downlink control message, or both, to generate a first sequence of SRIs and RVs for the nominal PUSCH repetitions; and
   modifying, by the UE, the first sequence of the SRIs and the RVs for the nominal PUSCH repetitions based on the quantity of the actual PUSCH repetitions to generate a second sequence of SRIs and RVs for the actual PUSCH repetitions.

3. The method of claim 2, wherein modifying the first sequence of the SRIs and the RVs for the nominal PUSCH repetitions includes inserting a particular SRI, a particular RV, or both, into the first sequence corresponding to a particular actual PUSCH repetition occurring after a slot boundary or after one or more invalid symbols of a nominal repetition to generate the second sequence of SRIs and RVs for the actual PUSCH repetitions.

4. The method of claim 3, further comprising refraining, by the UE, from modifying one or more original SRIs and RVs of the first sequence of the SRIs and the RVs for the nominal PUSCH repetitions to generate the second sequence of SRIs and RVs for the actual PUSCH repetitions.

5. The method of claim 4, wherein the particular SRI, the particular RV, or both, for the particular actual PUSCH repetition occurring after the slot boundary or after the one or more invalid symbols of the nominal repetition have the same value as a corresponding SRI, RV, or both, for a corresponding PUSCH repetition occurring before the slot boundary or before the one or more invalid symbols of the nominal repetition.

6. The method of claim 4, wherein the particular SRI, the particular RV, or both, have a different value for the particular actual PUSCH repetition occurring after the slot boundary or after the one or more invalid symbols of the nominal repetition from a value of a corresponding SRI, RV, or both, for a corresponding PUSCH repetition occurring before the slot boundary or before the one or more invalid symbols of the nominal repetition.

7. The method of claim 6, wherein the particular SRI, the particular RV, or both, inserted into the first sequence of the SRIs and the RVs for the nominal PUSCH repetition are determined based on a mapping or a formula.

8. The method of claim 7, wherein the different value of the particular SRI, the particular RV, or both, for the particular actual PUSCH repetition occurring after the slot boundary or after the one or more invalid symbols of the nominal repetition is determined based on the formula, and wherein the formula includes an input for an original value of the particular SRI, the particular RV, or both, for a nominal PUSCH repetition which corresponds to the particular actual PUSCH repetition, for an original value of the particular SRI, the particular RV, or both, for other nominal PUSCH repetitions, for the quantity of nominal PUSCH repetitions, for the quantity of actual PUSCH repetitions, or a combination thereof.

9. The method of claim 8, further comprising, prior to receiving the downlink control message, receiving, by the UE, a radio resource control (RRC) message indicating the mapping, wherein the mapping corresponds to a table and is based on inputs of an original value for a corresponding nominal PUSCH repetition for the particular actual PUSCH repetition, an original value of other nominal PUSCH repetitions, the quantity of nominal PUSCH repetitions, the quantity of actual PUSCH repetitions, or a combination thereof.

10. The method of claim 1, wherein the second field includes two or more Sounding Reference Signal (SRS) Resource Indicators (SRIs) which indicate the two or more sets of transmission parameters, and wherein determining the SRIs and the RVs for the actual PUSCH repetitions includes determining, by the UE, a sequence of the SRIs and the RVs for the actual PUSCH repetitions based on the quantity of the actual PUSCH repetitions and a cyclic pattern.

11. The method of claim 10, wherein:
the SRIs, the RVs, or both individually, have the cyclic pattern; or
pairs of corresponding SRI and RV values have the cyclic pattern jointly.

12. The method of claim 10, wherein:
the cyclic pattern is received in the downlink control message, the downlink control message comprising Downlink Control Information (DCI); or
the cyclic pattern is received in radio resource control (RRC) message and stored at the UE prior to receiving the downlink control message.

13. The method of claim 1, wherein the sets of transmission parameters are determined based on a first scheme, and wherein the RVs are determined based on a second scheme that is different from the first scheme.

14. The method of claim 1, wherein the sets of transmission parameters are determined based on modifying a sequence of Sounding Reference Signal (SRS) Resource Indicators (SRIs) for the nominal PUSCH repetitions, and wherein the RVs are determined based on a cyclic pattern.

15. The method of claim 1, wherein the slot configuration data includes uplink downlink symbol data, slot length, or a combination thereof, wherein one or more invalid symbols of a nominal repetition correspond to a transition between an uplink symbol and a downlink symbol in a slot, and further comprising:
receiving, by the UE, an RRC message indicating one or more patterns of invalid symbols;
receiving, by the UE, a DCI message indicating a particular pattern of invalid symbols of the one or more patterns of invalid symbols;
determining, by the UE, one or more invalid symbols of the nominal PUSCH repetitions based on the particular pattern of invalid symbols;
determining, by the UE, uplink downlink switches based on the uplink downlink symbol data;
determining, by the UE, slot boundaries based on slot length data;
determining, by the UE, the quantity of actual PUSCH repetitions based on the quantity of nominal PUSCH repetitions, the one or more invalid symbols, the uplink downlink switches, and the slot boundaries; and
generating, by the UE, the PUSCH repetition transmissions based on the set of transmission parameters and the RV for the actual PUSCH repetitions.

16. The method of claim 1, further comprising:
receiving, by the UE, a second downlink control message including a field indicating a quantity of nominal Physical Downlink Shared Channel (PDSCH) repetitions over two or more Transmission Configuration Indicator (TCI) states;
determining, by the UE, a quantity of actual PDSCH repetitions based on the quantity of nominal PDSCH repetitions and slot configuration data;
determining, by the UE, a TCI state and a redundancy version (RV) for each PDSCH repetition of the actual PDSCH repetitions based on at least the quantity of the actual PDSCH repetitions; and
receiving, by the UE, PDSCH repetitions transmissions based on the TCI state and the RV for the actual PDSCH repetitions.

17. An apparatus configured for wireless communication, the apparatus comprising:
means for receiving, by a user equipment (UE), a downlink control message including a first field indicating a quantity of nominal Physical Uplink Shared Channel (PUSCH) repetitions and a second field indicating two or more sets of transmission parameters to be used for transmission of PUSCH repetitions;
means for determining, by the UE, a quantity of actual PUSCH repetitions based on the quantity of nominal PUSCH repetitions and slot configuration data;
means for determining, by the UE, a set of transmission parameters and a redundancy version (RV) for each PUSCH repetition of the actual PUSCH repetitions based on at least the quantity of the actual PUSCH repetitions; and
means for transmitting, by the UE, the PUSCH repetitions transmissions based on the set of transmission parameters and the RV for the actual PUSCH repetitions.

18. The apparatus of claim 17, wherein the second field includes two or more Sounding Reference Signal (SRS) Resource Indicators (SRIs) which indicate the two or more sets of transmission parameters, and further comprising:
means for determining, by the UE, an original SRI and RV for each of the nominal PUSCH repetitions based on RRC configurations, the downlink control message, or both, to generate a first sequence of SRIs and RVs for the nominal PUSCH repetitions; and
means for modifying, by the UE, the first sequence of the SRIs and the RVs for the nominal PUSCH repetitions based on the quantity of the actual PUSCH repetitions to generate a second sequence of SRIs and RVs for the actual PUSCH repetitions.

19. The apparatus of claim 18, wherein the means for modifying the first sequence of the SRIs and the RVs for the nominal PUSCH repetitions includes means for inserting a particular SRI, a particular RV, or both, into the first sequence corresponding to a particular actual PUSCH repetition occurring after a slot boundary or after one or more invalid symbols of a nominal repetition to generate the second sequence of SRIs and RVs for the actual PUSCH repetitions, and further comprising means for refraining from modifying one or more original SRIs and RVs of the first sequence of the SRIs and the RVs for the nominal PUSCH repetitions to generate the second sequence of SRIs and RVs for the actual PUSCH repetitions.

20. The apparatus of claim 19, wherein the slot configuration data includes uplink downlink symbol data, slot length, or a combination thereof, wherein one or more invalid symbols of a nominal repetition corresponds to a transition between an uplink symbol and a downlink symbol in the slot, and further comprising:
means for determining uplink downlink switches based on the uplink downlink symbol data;
means for determining slot boundaries based on slot length data;
means for determining the quantity of actual PUSCH repetitions based on the quantity of nominal PUSCH repetitions, the uplink downlink switches, and the slot boundaries; and
means for generating the PUSCH repetition transmissions based on the SRI and the RV for the actual PUSCH repetitions.

21. A non-transitory computer-readable medium having program code recorded thereon, the program code comprising:
program code executable by a computer for causing the computer to receive, by a user equipment (UE), a downlink control message including a first field indicating a quantity of nominal Physical Uplink Shared Channel (PUSCH) repetitions and a second field indicating two or more sets of transmission parameters to be used for transmission of PUSCH repetitions;
program code executable by a computer for causing the computer to determine, by the UE, a quantity of actual PUSCH repetitions based on the quantity of nominal PUSCH repetitions and slot configuration data;
program code executable by a computer for causing the computer to determine, by the UE, a set of transmission parameters and a redundancy version (RV) for each PUSCH repetition of the actual PUSCH repetitions based on at least the quantity of the actual PUSCH repetitions; and
program code executable by a computer for causing the computer to transmit, by the UE, the PUSCH repetitions transmissions based on the set of transmission parameters and the RV for the actual PUSCH repetitions.

22. The non-transitory computer-readable medium of claim 21, wherein the second field includes two or more Sounding Reference Signal (SRS) Resource Indicators (SRIs) which indicate the two or more sets of transmission parameters, and further comprising:
program code executable by a computer for causing the computer to determine, by the UE, an original SRI and RV for each of the nominal PUSCH repetitions based on RRC configurations, the downlink control message, or both, to generate a first sequence of SRIs and RVs for the nominal PUSCH repetitions; and
program code executable by a computer for causing the computer to modify, by the UE, the first sequence of the SRIs and the RVs for the nominal PUSCH repetitions based on the quantity of the actual PUSCH repetitions to generate a second sequence of SRIs and RVs for the actual PUSCH repetitions.

23. The non-transitory computer-readable medium of claim 22, wherein program code for modifying the first sequence of the SRIs and the RVs for the nominal PUSCH repetitions includes program code executable by a computer for causing the computer to insert a particular SRI, a particular RV, or both, into the first sequence corresponding to a particular actual PUSCH repetition occurring after a slot boundary or after one or more invalid symbols of a nominal repetition to generate the second sequence of SRIs and RVs for the actual PUSCH repetitions.

24. The non-transitory computer-readable medium of claim 21, wherein the second field includes two or more Sounding Reference Signal (SRS) Resource Indicators (SRIs) which indicate the two or more sets of transmission parameters, and wherein the program code for determining the SRIs and the RVs for the actual PUSCH repetitions includes program code executable by a computer for causing the computer to determine, by the UE, a sequence of the SRIs and the RVs for the actual PUSCH repetitions based on the quantity of the actual PUSCH repetitions and a cyclic pattern.

25. The non-transitory computer-readable medium of claim 21, wherein the slot configuration data includes uplink downlink symbol data, slot length, or a combination thereof, wherein one or more invalid symbols of a nominal repetition corresponds to a transition between an uplink symbol and a downlink symbol in the slot, and further comprising:
program code executable by a computer for causing the computer to determine uplink downlink switches based on the uplink downlink symbol data;
program code executable by a computer for causing the computer to determine slot boundaries based on slot length data;
program code executable by a computer for causing the computer to determine the quantity of actual PUSCH repetitions based on the quantity of nominal PUSCH repetitions, the uplink downlink switches, and the slot boundaries; and
program code executable by a computer for causing the computer to generate the PUSCH repetition transmissions based on the set of transmission parameters and the RV for the actual PUSCH repetitions.

26. An apparatus configured for wireless communication, the apparatus comprising:
at least one processor; and
a memory coupled to the at least one processor, wherein the at least one processor is configured:
  to receive, by a user equipment (UE), a downlink control message including a first field indicating a quantity of nominal Physical Uplink Shared Channel (PUSCH) repetitions and a second field indicating two or more sets of transmission parameters to be used for transmission of PUSCH repetitions;
  to determine, by the UE, a quantity of actual PUSCH repetitions based on the quantity of nominal PUSCH repetitions and slot configuration data;
  to determine, by the UE, a set of transmission parameters and a redundancy version (RV) for each PUSCH repetition of the actual PUSCH repetitions based on at least the quantity of the actual PUSCH repetitions; and
  to transmit, by the UE, the PUSCH repetitions transmissions based on the set of transmission parameters and the RV for the actual PUSCH repetitions.

27. The apparatus of claim 26, wherein the second field includes two or more Sounding Reference Signal (SRS) Resource Indicators (SRIs), and wherein the at least one processor is further configured:
  to determine, by the UE, an original SRI and RV for each of the nominal PUSCH repetitions based on RRC configurations, the downlink control message, or both, to generate a first sequence of SRIs and RVs for the nominal PUSCH repetitions; and
  to modify, by the UE, the first sequence of the SRIs and the RVs for the nominal PUSCH repetitions based on the quantity of the actual PUSCH repetitions to generate a second sequence of SRIs and RVs for the actual PUSCH repetitions.

28. The apparatus of claim 27, wherein modifying the first sequence of the SRIs and the RVs for the nominal PUSCH repetitions includes inserting a particular SRI, a particular RV, or both, into the first sequence corresponding to a particular actual PUSCH repetition occurring after a slot boundary or after one or more invalid symbols of a nominal repetition to generate the second sequence of SRIs and RVs for the actual PUSCH repetitions.

29. The apparatus of claim 26, wherein the set of transmission parameters includes one or more Sounding Reference Signal (SRS) Resource Indicators (SRIs), and wherein determining the SRIs and the RVs for the actual PUSCH repetitions includes determining a sequence of the SRIs and the RVs for the actual PUSCH repetitions based on the quantity of the actual PUSCH repetitions and a cyclic pattern.

30. The apparatus of claim 26, wherein the slot configuration data includes uplink downlink symbol data, slot length, or a combination thereof, wherein one or more invalid symbols of a nominal repetition corresponds to a transition between an uplink symbol and a downlink symbol in the slot, and wherein the at least one processor is further configured:
  to determine uplink downlink switches based on the uplink downlink symbol data;
  to determine slot boundaries based on slot length data;
  to determine the quantity of actual PUSCH repetitions based on the quantity of nominal PUSCH repetitions, the uplink downlink switches, and the slot boundaries; and
  to generate the PUSCH repetition transmissions based on the set of transmission parameters and the RV for the actual PUSCH repetitions.

* * * * *